(12) United States Patent
Yuan et al.

(10) Patent No.: US 12,515,626 B2
(45) Date of Patent: Jan. 6, 2026

(54) SYSTEMS AND METHODS FOR HANDLING AN OPEN DOOR OF A VEHICLE

(71) Applicant: Apollo Autonomous Driving USA LLC, Sunnyvale, CA (US)

(72) Inventors: Baoping Yuan, Sunnyvale, CA (US); Yaoming Shen, Sunnyvale, CA (US)

(73) Assignee: Apollo Autonomous Driving USA LLC, Sunnyvale, CA (US)

( * ) Notice: Subject to any disclaimer, the term of this patent is extended or adjusted under 35 U.S.C. 154(b) by 231 days.

(21) Appl. No.: 18/319,432

(22) Filed: May 17, 2023

(65) Prior Publication Data

US 2024/0383459 A1 Nov. 21, 2024

(51) Int. Cl.
*B60T 8/88* (2006.01)
*B60Q 9/00* (2006.01)
*B60T 7/12* (2006.01)
*B60T 8/17* (2006.01)
*B60T 8/171* (2006.01)
(Continued)

(52) U.S. Cl.
CPC ............... *B60T 8/885* (2013.01); *B60Q 9/00* (2013.01); *B60T 7/12* (2013.01); *B60T 8/1701* (2013.01); *B60T 8/171* (2013.01); *B60T 8/92* (2013.01); *B60T 17/22* (2013.01); *B60W 10/10* (2013.01); *B60W 10/18* (2013.01); *B60W 30/18109* (2013.01); *B60T 2210/10* (2013.01); *B60T 2210/20* (2013.01); *B60T 2250/00* (2013.01); *B60T 2250/02* (2013.01); *B60T 2270/402* (2013.01); *B60T 2270/406* (2013.01); *B60T 2270/408* (2013.01); *B60W 2510/18* (2013.01); *B60W 2520/10* (2013.01); *B60W 2530/00* (2013.01); *B60W 2710/10* (2013.01); *B60W 2710/18* (2013.01)

(58) Field of Classification Search
CPC .......... B60T 8/885; B60T 7/12; B60T 8/1701; B60T 8/171; B60T 8/92; B60T 17/22; B60T 2210/10; B60T 2210/20; B60T 2250/00; B60T 2250/02; B60T 2270/402; B60T 2270/406; B60T 2270/408; B60T 7/22; B60Q 9/00; B60W 10/10; B60W 10/18; B60W 30/18109; B60W 2510/18; B60W 2520/10; B60W 2530/00; B60W 2710/10; B60W 2710/18
USPC .......................................................... 701/70
See application file for complete search history.

(56) References Cited

FOREIGN PATENT DOCUMENTS

DE 112014006308 T5 * 11/2016 ............ B60T 13/588

* cited by examiner

*Primary Examiner* — Lindsay M Low
*Assistant Examiner* — Omar Morales
(74) *Attorney, Agent, or Firm* — Oppedahl Patent Law Firm LLC

(57) ABSTRACT

Operating a vehicle with an open door creates risks. Embodiments herein consider both when a vehicle is in an autonomous driving (AD) mode and a manual mode. When in AD mode, if an occupant opens the doors while the vehicle is moving, the control system may lower the speed to stop and may park the vehicle (or not park it depending upon the control policy). If an occupant opens the doors when the vehicle is stationary, the control system may keep the vehicle from rolling and from brake system failures. When the vehicle is in a manual model and a door is opened when the vehicle is moving, a warning message may be triggered; whereas, if a door is opened when the vehicle is stationary, the control system may keep the vehicle from rolling and from brake system failures. Warning messages may be triggered for different stages/conditions.

20 Claims, 17 Drawing Sheets

(51) Int. Cl.
*B60T 8/92*     (2006.01)
*B60T 17/22*    (2006.01)
*B60W 10/10*    (2012.01)
*B60W 10/18*    (2012.01)
*B60W 30/18*    (2012.01)

SYSTEMS AND METHODS FOR HANDLING AN OPEN DOOR OF A VEHICLE

TECHNICAL FIELD

Embodiments of the present disclosure relate generally to operating autonomous driving vehicles. More particularly, embodiments of the disclosure relate to the handling situations in which a door of a vehicle is opened.

It shall be noted that the subject matter discussed in the background section should not be assumed to be prior art merely because of it being mentioned in this background section. Similarly, a problem mentioned in the background section or associated with the subject matter of the background section should not be assumed to have been previously recognized in the prior art. The subject matter in the background section merely represents different approaches, which in and of themselves may also be inventions.

BACKGROUND

Today, some vehicles are equipped with the ability to operate in an autonomous mode (or nearly autonomous mode) in addition to being able to be operated under direct user control (i.e., manual mode). Whether a vehicle is operating in a manual mode or in an autonomous mode, issues can arise that should be addressed. One such issue that may occur during vehicle operation is the opening of a door of the vehicle. The door may be opened (inadvertently or deliberately), may not have been shut properly, or may be malfunctioning. Regardless of the reason for the open door in the vehicle, an open door poses issues.

First, whether a vehicle is operating under direct user control or in an autonomous mode, safety is always a paramount concern. An open door can be a safety hazard for both the vehicle occupants and other road users. It may increase the risk of passengers falling out of the vehicle, especially when the vehicle is in motion. Additionally, an open door can obstruct the driver's visibility, making it difficult to see surrounding traffic, pedestrians, or obstacles, leading to potential accidents.

Second, in cases of an accident or sudden maneuver, an open door may result in one or more passengers being ejected from the vehicle—causing serious injuries or even fatalities. In addition, vehicle doors are designed to provide structural support during a crash and may include safety features (e.g., side impact airbags). Operating a vehicle with an open door may compromise the integrity of these vehicle safety features.

Third, driving with an open door may be a violation of traffic laws and regulations. Law enforcement officers may issue fines or citations for such violations, which can result in financial penalties and even affect the driver's license status.

Fourth, driving with an open door may cause mechanical damage to the vehicle. The open door may hit objects like curbs, posts, poles, cyclists, or other vehicles, resulting in dents, scratches, or other damages to the door, hinges, and surrounding body parts. This damage may result in costly repairs or replacements.

Fifth, the performance of the vehicle may be affected. An open vehicle door may adversely affect the aerodynamics of the vehicle. Increased air resistance reduces the vehicle's fuel efficiency—resulting in higher fuel consumption, leading to increased costs and more impact to the environment.

Finally, driving with an open door may significantly reduce the quality of the ride for the vehicle's occupants. An open door may cause discomfort to occupants due to wind noise, dust, or other environmental factors. It can also interfere with the normal operation of the vehicle, such as difficulties in accessing controls, fastening seat belts, or properly closing the door when needed.

Thus, operating a vehicle which an open door can pose safety risks, legal violations, potential mechanical damages, increased fuel consumption, and inconvenience to the occupants. It is important to operate a vehicle with all doors securely closed to ensure the safety and well-being of all occupants and other road users.

Accordingly, what is needed are systems and methods that can address the issue of an open vehicle door regardless of the operational mode (e.g., manual mode or autonomous mode) of the vehicle.

BRIEF DESCRIPTION OF THE DRAWINGS

References will be made to embodiments of the disclosure, examples of which may be illustrated in the accompanying figures. These figures are intended to be illustrative, not limiting. Although the disclosure is generally described in the context of these embodiments, it should be understood that it is not intended to limit the scope of the disclosure to these particular embodiments. Items in the figures may not be to scale.

DETAILED DESCRIPTION

Figure 1:
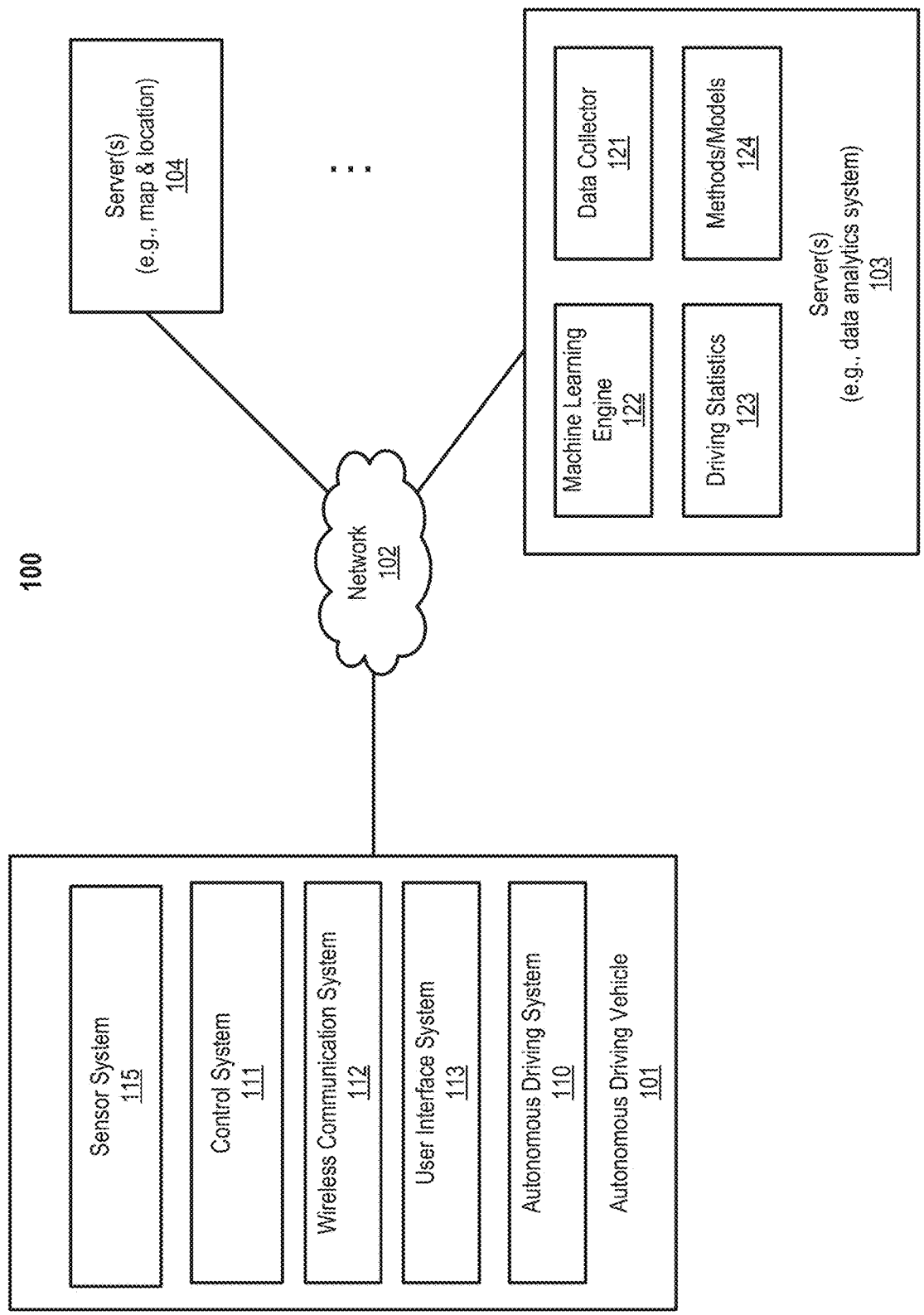
FIG. 1 is a block diagram illustrating a networked system, according to embodiments of the present disclosure.

Various embodiments and aspects of the disclosures will be described with reference to details discussed below, and the accompanying drawings will illustrate the various embodiments. The following description and drawings are illustrative of the disclosure and are not to be construed as limiting the disclosure. Numerous specific details are described to provide a thorough understanding of various embodiments of the present disclosure. However, in certain instances, well-known or conventional details are not described in order to provide a concise discussion of embodiments of the present disclosures. Furthermore, one skilled in the art will recognize that embodiments of the present disclosure, described below, may be implemented in a variety of ways, such as a process, an apparatus, a system, a device, or a method on a tangible computer-readable medium.

Components, or modules, shown in diagrams are illustrative of exemplary embodiments of the disclosure and are meant to avoid obscuring the disclosure. It shall be understood that throughout this discussion that components may be described as separate functional units, which may comprise sub-units, but those skilled in the art will recognize that various components, or portions thereof, may be divided into separate components or may be integrated together, including, for example, being in a single system or component. It should be noted that functions or operations discussed herein may be implemented as components. Components may be implemented in software, hardware, or a combination thereof.

Furthermore, connections between components or systems within the figures are not intended to be limited to direct connections. Rather, data between these components may be modified, re-formatted, or otherwise changed by intermediary components. Also, additional or fewer connections may be used. It shall also be noted that the terms "coupled," "connected," "communicatively coupled," "interfacing," "interface," or any of their derivatives shall be understood to include direct connections, indirect connections through one or more intermediary devices, and wireless connections. It shall also be noted that any communication, such as a signal, response, reply, acknowledgment, message, query, etc., may comprise one or more exchanges of information.

Reference in the specification to "one or more embodiments," "preferred embodiment," "an embodiment," "embodiments," or the like means that a particular feature, structure, characteristic, or function described in connection with the embodiment is included in at least one embodiment of the disclosure and may be in more than one embodiment. Also, the appearances of the above-noted phrases in various places in the specification are not necessarily all referring to the same embodiment or embodiments.

The use of certain terms in various places in the specification is for illustration and should not be construed as limiting. A service, function, or resource is not limited to a single service, function, or resource; usage of these terms may refer to a grouping of related services, functions, or resources, which may be distributed or aggregated. The terms "include," "including," "comprise," "comprising," or any of their variants shall be understood to be open terms, and any lists of items that follow are example items and not meant to be limited to the listed items. A "layer" may comprise one or more operations. The words "optimal," "optimize," "optimization," and the like refer to an improvement of an outcome or a process and do not require that the specified outcome or process has achieved an "optimal" or peak state. The use of memory, database, information base, data store, tables, hardware, cache, and the like may be used herein to refer to system component or components into which information may be entered or otherwise recorded. A set may contain any number of elements, including the empty set.

One skilled in the art shall recognize that: (1) certain steps may optionally be performed; (2) steps may not be limited to the specific order set forth herein; (3) certain steps may be performed in different orders; and (4) certain steps may be done concurrently.

Any headings used herein are for organizational purposes only and shall not be used to limit the scope of the description or the claims. Each reference/document mentioned in this patent document is incorporated by reference herein in its entirety.

A. General Overview

A vehicle's control system should make a vehicle reliable and safe if a passenger or the operator opens the door during running or stops, whether the vehicle is operating in a manual mode or in an autonomous driving (AD) mode. If the vehicle's control system does not address such issues, it creates serious safety issues, along with other issues that were discussed above.

The vehicle's control system may have different methodologies depending upon different factors, such as operational mode (e.g., manual versus autonomous), which door is open, vehicle speed when the door is opened, etc. An open door when a vehicle is operating in a non-autonomous driving mode (e.g., manual mode) may have a different control strategy than when operating in an AD mode. For example, in one or more embodiments, the vehicle's control system may provide minimal interventions or interactions and only if the driver's side door is opened. Therefore, in one or more embodiments, an AD vehicle control system may contain one or more control methodologies to make AD vehicles safe and reliable when in AD mode, but may contain one or more control methodologies that provide limited actions if in a non-AD mode (or if the vehicle is a non-AD model). Presented herein are embodiments of vehicle controls for AD and non-AD modes or vehicle models when a passenger or driver opens a door during a vehicle operation (e.g., while driving or during a standstill status).

Traditionally, most systems only provide an indicator (e.g., light and/or sound) if a door is not closed. Some AD control systems may cause the vehicle to start braking by applying brake pressure if the vehicle's door is open; however, this approach does not consider the limitations of a brake system, which includes several factors such as maximum pressure limitation based on electric system/actuator temperature and brake system holding period threshold. Also, the traditional approaches do not consider different scenarios, such as when the vehicle is operating in an AD mode or a manual mode.

In contrast, embodiments herein consider different scenarios, such as when a vehicle is operating in an AD mode versus when a vehicle is operating in a manual mode. Embodiments recognize that the underlying responsibility is related to the operational mode; thus, an aspect of embodiments comprises defining the responsibility differently when the vehicle is in an AD mode or in a manual mode. In one or more embodiments, when the vehicle is in an AD mode, the vehicle's AD control system may be configured to fully control the vehicle by the AD control logic. In contrast, when the vehicle is operating in a manual mode, embodiments may take the approach that the principal actor responsible for controlling the vehicle, including its overall safety, is the driver. Embodiments also contemplate that a server, a vehicle manager, or a driver may switch the vehicle mode between the AD mode and manual mode, and the vehicle's control system should respond accordingly.

In one or more embodiments, the division of responsibilities and control of the vehicle may be as follows.

For AD modes, the autonomous driving system is the leader and is primarily responsible for vehicle control. The control system directs vehicle protection under any conditions and controls the braking system (which may include a primary braking system (PBS), a secondary braking system (SBS), an electronic/emergency parking brake system (EPB), etc.). The control system may set and/or apply thresholds and limits to protect the vehicle and the safety of occupants. In one or more embodiments, if the use of one or more braking systems does not ensure safety, a passenger may be alerted, and an emergency braking system and a warning may be implemented.

For example, when a vehicle is operating in an AD mode, if an occupant opens one of the doors while the vehicle is moving, the vehicle's control system may (depending upon the control policy embodiment) lower the speed to stop and cause the vehicle to park. During this time, in one or more embodiments, short warning messages may be sent or activated. In one or more embodiments, when a vehicle is operating in an AD mode, if an occupant opens a door while the vehicle is at a standstill, the control system may keep the vehicle stationary to ensure safety—even if there are one or more brake system failures. At the same time, in one or more embodiments, there may be short warning messages activated.

In a non-autonomous driving mode, the driver may be treated as the lead actor who is responsible for vehicle control. When the vehicle is operating in a manual mode and an occupant opens a door while the vehicle is moving, in one or more embodiments, the vehicle control system may only cause a warning message to be activated to alert the driver. In one or more embodiments, if a door is opened during a manual mode operation while the vehicle is stationary, the vehicle may alert the driver and wait a pre-set amount of time before taking any action (or may take no action).

It shall be noted that embodiments here may consider a set of factors or conditions when determining its response. For example, in one or more embodiments, the open/closed status of just the driver's door may be considered; in contrast, in embodiments, one or more other doors of the vehicle may also be considered.

It shall also be noted that different warning messages may be triggered given different conditions (e.g., which door was opened, vehicle speed, surface slope angle, operational mode, vehicle device's or devices' failing stage(s) (e.g., success or failure of a braking system), etc.).

B. Embodiments for Handling an Open Door

FIG. 1 is a block diagram illustrating an autonomous driving network configuration according to one or more embodiments of the present disclosure. Referring to FIG. 1, network configuration 100 includes autonomous driving vehicle (ADV) 101 that may be communicatively coupled to one or more servers 103-104 over a network 102. Although one ADV is shown, multiple ADVs may be coupled to each other and/or coupled to servers 103-104 over network 102. Network 102 may be any type of network, such as a local area network (LAN), a wide area network (WAN) such as the Internet, a cellular network, a satellite network, an edge network, or a combination thereof, and may comprise wired, wireless, or both connectivity. Server(s) 103-104 may be any kind of server or a cluster of servers, such as Web or cloud servers, application servers, backend servers, or a combination thereof. Servers 103-104 may be data analytics servers, content servers, traffic information servers, map and point of interest (MPOI) servers, location servers, etc.

An ADV refers to a vehicle that may be configured to operate in an autonomous mode in which the vehicle navigates through an environment with little or no input from a driver. Such an ADV may include a sensor system having one or more sensors that are configured to detect information about the environment in which the vehicle operates. The vehicle and its associated controller(s) may use the detected information to navigate through the environment. ADV 101 may operate in a manual mode, a fully autonomous mode, or a partially autonomous mode.

In one or more embodiments, ADV 101 includes, but is not limited to, an autonomous driving system (ADS) 110, vehicle control system 111, wireless communication system 112, user interface system 113, and sensor system 115. ADV 101 may further include certain common components included in ordinary vehicles, such as an engine, wheels, steering wheel, transmission, etc., which may be controlled by vehicle control system 111 and/or ADS 110 using a variety of communication signals and/or commands, such as, for example, acceleration signals or commands, deceleration signals or commands, steering signals or commands, braking signals or commands, etc.

Components 110-115 may be communicatively coupled to each other via an interconnect, a bus, a network, wireless signals, or a combination thereof. For example, components 110-115 may be communicatively coupled to each other via a controller area network (CAN) bus. In one or more embodiments, a CAN bus is a vehicle bus standard designed to allow microcontrollers and devices to communicate with each other in applications without a host computer; it is a message-based protocol, designed originally for multiplex electrical wiring within automobiles but may also be used in many other contexts.

Figure 2:
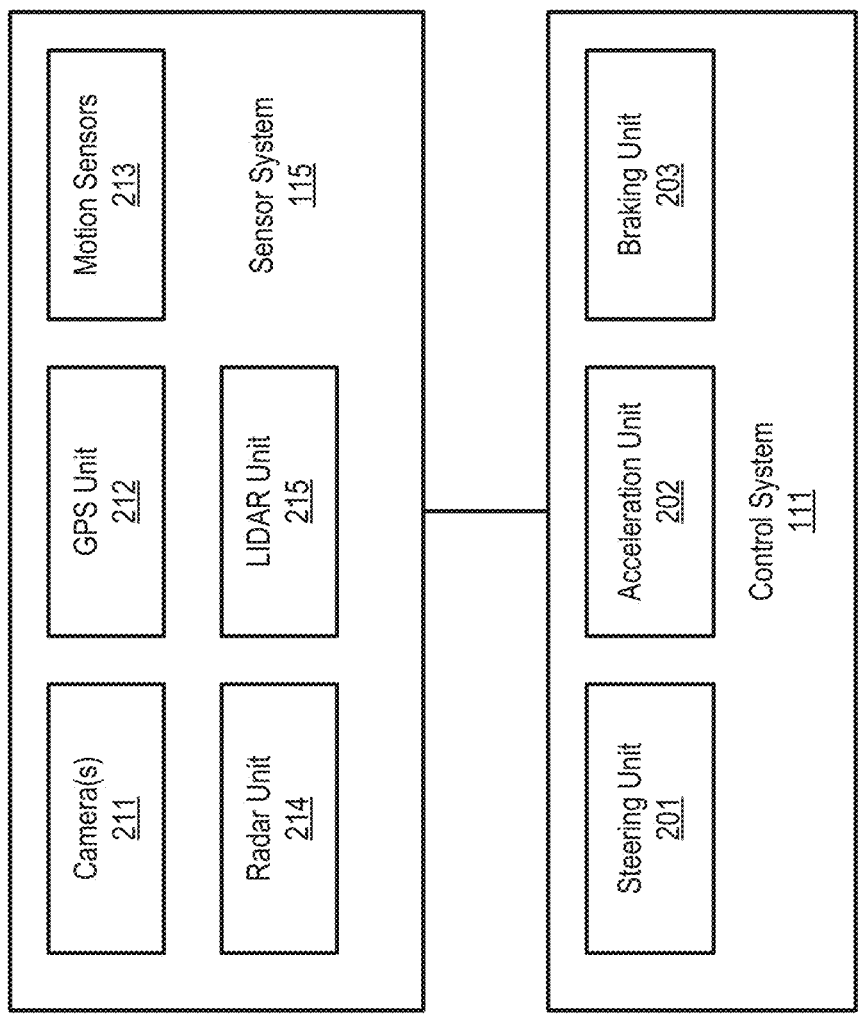
FIG. 2 is a block diagram illustrating an example of an autonomous driving vehicle, according to embodiments of the present disclosure.

Referring now to FIG. 2, in one or more embodiments, the sensor system 115 includes, but is not limited to, one or more cameras 211, a global positioning system (GPS) unit or module 212, one or more motion sensors (e.g., inertial measurement unit (IMU), accelerometer, etc.) 213, radar unit 214, and a light detection and range (LIDAR) unit 215. GPS system 212 may include a transceiver operable to provide information regarding the position of the ADV. The motion sensor unit 213 may sense position and orientation changes of the ADV based on inertial acceleration. Radar unit 214 may represent a system that utilizes radio signals to sense objects within the local environment of the ADV. In one or more embodiments, in addition to sensing objects, radar unit 214 may additionally sense the speed and/or heading of the objects. LIDAR unit 215 may sense objects in the environment in which the ADV is located using lasers. LIDAR unit 215 could include one or more laser sources, a laser scanner, and one or more detectors, among other system components. Cameras 211 may include one or more devices to capture images of the environment surrounding the ADV. Cameras 211 may be still cameras and/or video cameras. A camera may be mechanically movable, for example, by mounting the camera on a rotating and/or tilting a platform.

Sensor system 115 may further include other sensors, such as a sonar sensor, an infrared sensor, a steering sensor, a throttle sensor, a braking sensor, an audio sensor (e.g., a microphone), and a weight or mass sensor. An audio sensor may be configured to capture sound from the environment surrounding the ADV. A steering sensor may be configured to sense the steering angle of a steering wheel, wheels of the vehicle, or a combination thereof. A throttle sensor and a braking sensor sense the throttle position and braking position of the vehicle, respectively. In some situations, a throttle sensor and a braking sensor may be integrated as an integrated throttle/braking sensor. In one or more embodiments, one or more sensors may be used to determine the mass or weight of the ADV, including its occupants and any other payload. In one or more embodiments, the mass/weight may be determined using one or more factors, such as torque (e.g., wheel torque need to accelerate, braking torque needed to accelerate or decelerate, etc.). Having one or more mass/weight sensors to gauge the overall weight of the ADV and its contents (including occupants) allows the ADV to use mass and/or weight parameters for one or more determinations, such as braking, accelerating, handling, etc.

In one or more embodiments, vehicle control system 111 includes, but is not limited to, steering unit 201, throttle unit 202 (also referred to as an acceleration unit), and braking unit 203 (also referred to as the braking system 203). Steering unit 201 may be used to adjust the direction or heading of the vehicle. Throttle unit 202 may be used to control the speed of the motor or engine which in turn controls the speed and acceleration of the vehicle. Braking unit 203 may be used to decelerate the vehicle by providing friction to slow the wheels or tires of the vehicle. The steering unit 201, the acceleration unit 202, and the braking system 203 may be coupled, in part, with the AD control or AD system (e.g., ADS 110 in FIG. 3A). The details of embodiments of the braking unit 203 will be discussed below, but it shall be noted that the braking system may comprise one or more braking units or systems (e.g., a primary braking system (PBS) and a secondary braking system (SBS), which is a redundant, backup braking system of the PBS, etc.). Note that the components as shown in FIG. 2 may be implemented in hardware, software, or a combination thereof.

Referring to FIG. 1, wireless communication system 112 is to allow communication between ADV 101 and external systems, such as devices, sensors, other vehicles, etc. For example, wireless communication system 112 may wirelessly communicate with one or more devices directly or via a communication network, such as servers 103-104 over network 102. Wireless communication system 112 may use any cellular communication network or a wireless local area network (WLAN), e.g., using WiFi to communicate with another component or system. Wireless communication system 112 may communicate directly with a device (e.g., a mobile device of a passenger, a display device, a speaker within vehicle 101), for example, using an infrared link, Bluetooth, etc. User interface system 113 may be part of peripheral devices implemented within vehicle 101 including, for example, a keyboard, a touch screen display device, a microphone, and a speaker, etc.

Some or all of the functions of ADV 101 may be controlled or managed by ADS 110, especially when operating in an autonomous driving mode, but may also provide functionality when operating in manual mode. ADS 110 includes hardware (e.g., processor(s), memory, storage, etc.) and software (e.g., operating system, planning and routing programs, etc.) to receive information from sensor system 115, control system 111, wireless communication system 112, and/or user interface system 113, process the received information, plan a route or path from a starting point to a destination point, and then drive vehicle 101 based on the planning and control information. Alternatively, ADS 110 may be integrated with vehicle control system 111.

For example, a user as a passenger may specify a starting location and a destination of a trip, for example, via a user interface. ADS 110 obtains the trip-related data. For example, ADS 110 may obtain location and route data from an MPOI server, which may be a part of servers 103-104. The location server provides location services and the MPOI server provides map services and the POIs of certain locations. Additionally, or alternatively, such location and MPOI information may be cached locally in a persistent storage device of ADS 110.

While ADV 101 is moving along the route, ADS 110 may also obtain real-time traffic information from a traffic information system or server (TIS). Note that servers 103-104 may be operated by a third-party entity. Additionally, or alternatively, the functionalities of servers 103-104 may be integrated with ADS 110. Based on the real-time traffic information, MPOI information, and location information, as well as real-time local environment data detected or sensed by the sensor system 115 (e.g., obstacles, objects, nearby vehicles), ADS 110 can plan an optimal route and drive vehicle 101, for example, via control system 111, according to the planned route to reach the specified destination safely and efficiently.

Server 103 may be a data analytics system to perform data analytics services for a variety of clients. In one or more embodiments, a data analytics system 103 includes a data collector 121 and a machine learning engine 122. Data collector 121 collects driving statistics 123 from a variety of vehicles, either ADVs or regular vehicles driven by human drivers. Driving statistics 123 include information indicating the driving commands (e.g., throttle, brake, steering commands) issued and responses of the vehicles (e.g., speeds, accelerations, decelerations, directions) captured by sensors of the vehicles at different points in time. Driving statistics 123 may further include information describing the driving environments at different points in time, such as, for example, routes (including starting and destination locations), MPOIs, road conditions, weather conditions, etc.

In one or more embodiments, based on driving statistics 123, machine learning engine 122 generates or trains a set of rules, algorithms (methods), and/or predictive models 124 for a variety of purposes. For example, in one or more embodiments, methods/models 124 may include one or more algorithms or models to receive data from a plurality of sensors mounted on the ADV related to the ADV being held at or brought to a standstill, one or more methods for detecting a status of the ADV including a rolling speed of the ADV based on the data from the plurality of sensors, one or more methods to activate or deactivate one or more of the braking units (e.g., a primary brake and/or a secondary brake) in response to detecting the status of the ADV being at a particular status, which may be based upon one or more predetermined speed threshold ranges. Methods/models 124 may be uploaded on ADVs to be utilized during autonomous driving in real time.

Figure 3A:
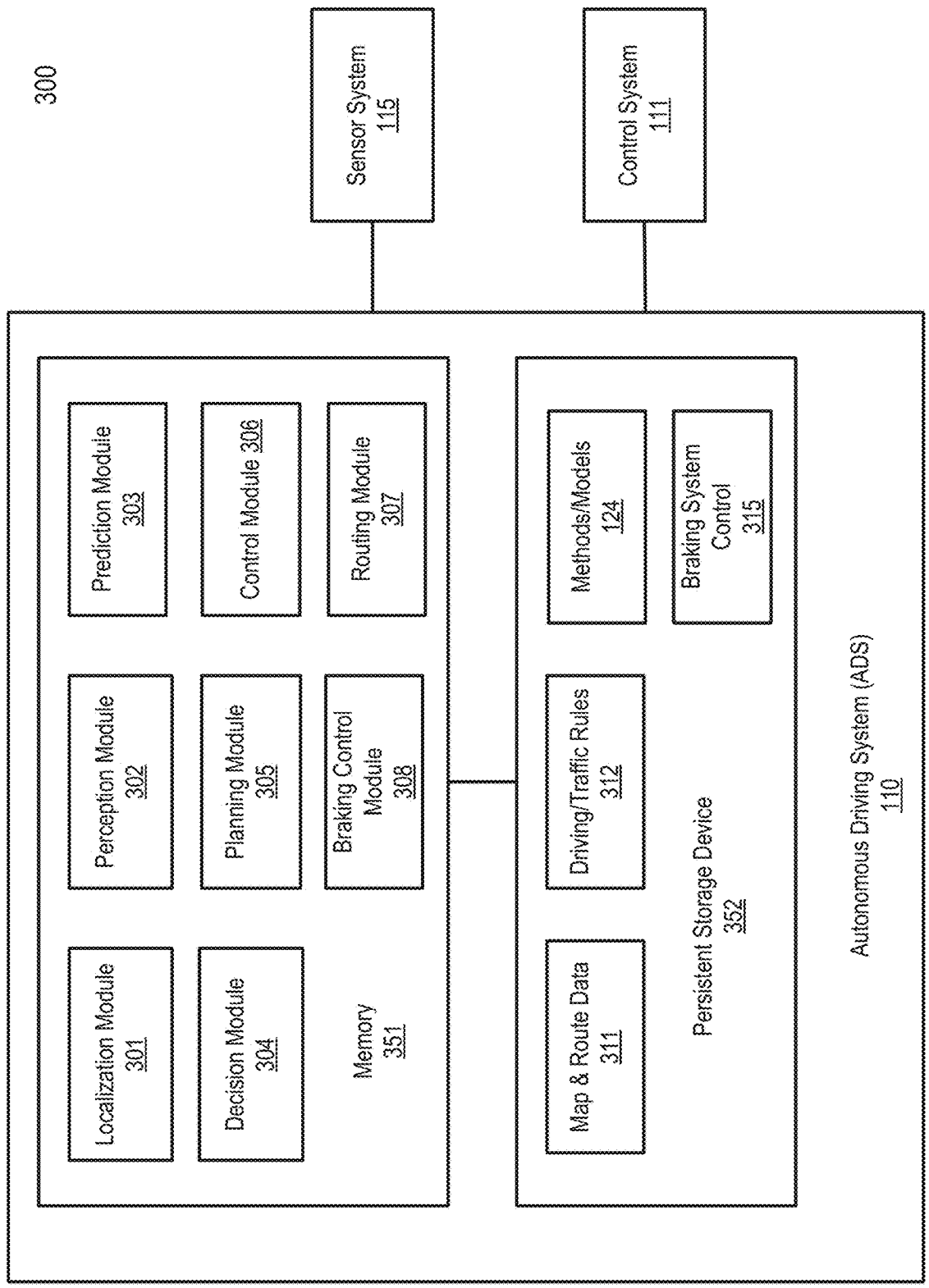
FIGS. 3A & 3B are block diagrams illustrating an example of an autonomous driving system used with an autonomous driving vehicle, according to embodiments of the present disclosure.
Figure 3B:
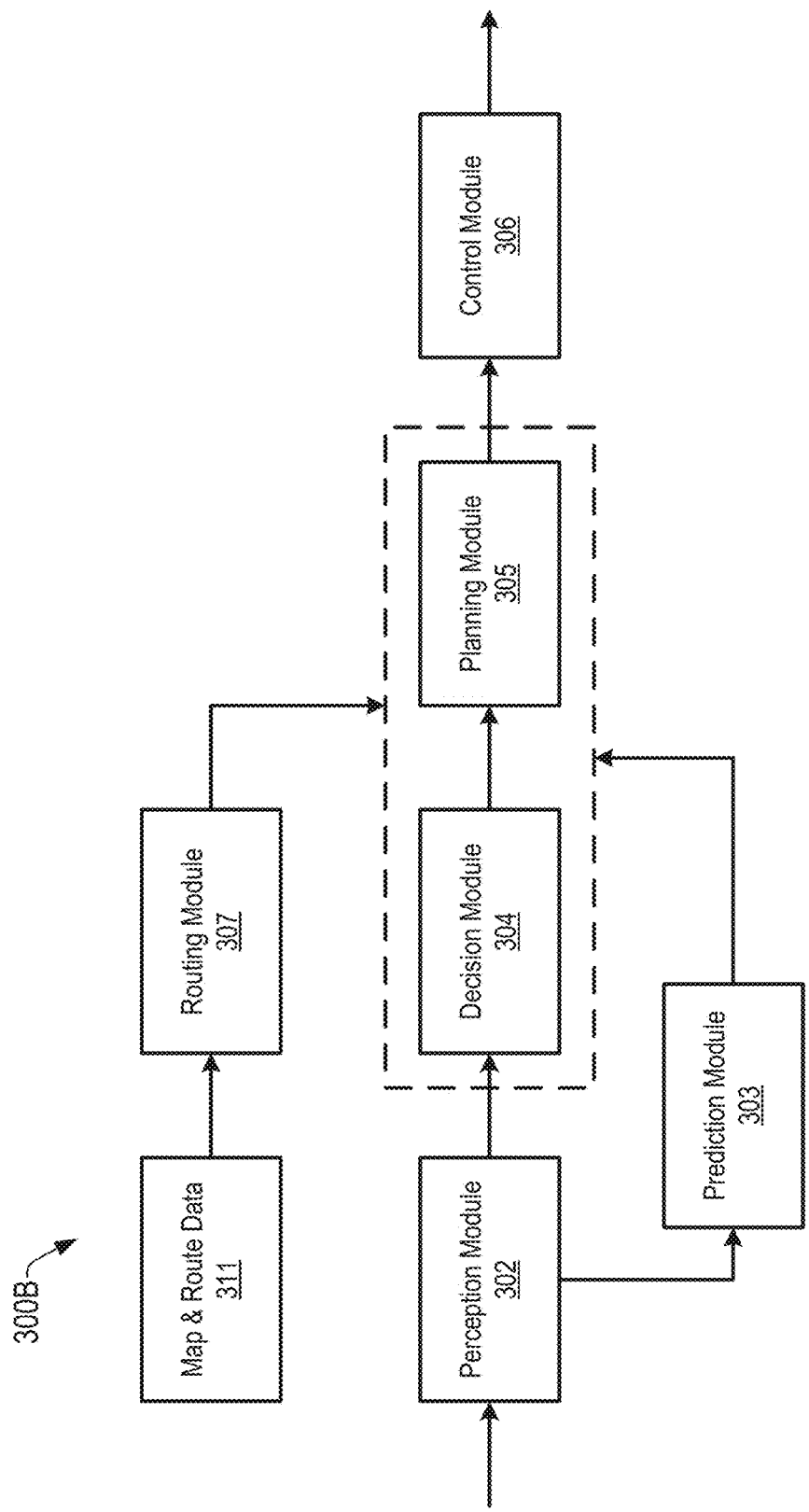

FIGS. 3A and 3B are block diagrams illustrating an example of an autonomous driving system used with an ADV, according to embodiments of the present disclosure.

System 300 may be implemented as a part of ADV 101 of FIG. 1 including, but is not limited to, ADS 110, control system 111, and sensor system 115. Referring to FIGS. 3A and 3B, ADS 110 includes, but is not limited to, localization module 301, perception module 302, prediction module 303, the decision module 304, planning module 305, control module 306, routing module 307, and braking system control module 308.

Some or all of modules 301-308 may be implemented in software, hardware, or a combination thereof. For example, these modules may be installed in persistent storage device 352, loaded into memory 351, and executed by one or more processors (not shown). Note that some or all of these modules may be communicatively coupled to or integrated with some or all modules of vehicle control system 111 of FIG. 2. Some of modules 301-308 may be integrated together as an integrated module.

Localization module 301 may determine a current location of ADV 300 (e.g., leveraging GPS unit 212) and manages any data related to a trip or route of a user. Localization module 301 (also referred to as a map and route module) manages any data related to a trip or route of a user. A user may log in and specify a starting location and a destination of a trip, for example, via a user interface. Localization module 301 communicates with other components of ADV 300, such as a map and route data 311, to obtain the trip-related data. For example, localization module 301 may obtain location and route data from a location server and a map and POI (MPOI) server. A location server provides location services and an MPOI server provides map services and the POIs of certain locations, which may be cached as part of map and route data 311. While ADV 300 is moving along the route, localization module 301 may also obtain real-time traffic information from a traffic information system or server.

Based on the sensor data provided by sensor system 115 and localization information obtained by localization module 301, a perception of the surrounding environment is determined by perception module 302. The perception information may represent what an ordinary driver would perceive surrounding a vehicle in which the driver is driving. The perception may include the lane configuration, traffic light signals, a relative position of another vehicle, a pedestrian, a building, a crosswalk, or other traffic-related signs (e.g., stop signs, yield signs), etc., for example, in a form of an object. The lane configuration includes information describing a lane or lanes, such as, for example, a shape of the lane (e.g., straight or curvature), a width of the lane, how many lanes in a road, one-way or two-way lane, merging or splitting lanes, exiting lane, etc.

Perception module 302 may include a computer vision system or functionalities of a computer vision system to process and analyze images captured by one or more cameras to identify objects and/or features in the environment of the ADV. The objects may include traffic signals, roadway boundaries, other vehicles, pedestrians, and/or obstacles, etc. The computer vision system may use object recognition methods, video tracking, and other computer vision techniques. In one or more embodiments, the computer vision system maps an environment, tracks objects, and estimates the speed of objects, etc. Perception module 302 may also detect objects based on other sensor data provided by other sensors such as a radar and/or LIDAR.

For each of the objects, prediction module 303 predicts how the object will behave under the circumstances. The prediction may be performed based on the perception data perceiving the driving environment at the point in time given a set of map/route information 311, traffic rules 312, and/or braking system control parameters 315. For example, if the object is a vehicle in an opposing direction and the current driving environment includes an intersection, prediction module 303 may predict whether the vehicle is likely to move straight forward or make a turn. If the perception data indicates that the intersection has no traffic light, prediction module 303 may predict that the vehicle may have to fully stop before entering the intersection. If the perception data indicates that the vehicle is currently at a left-turn-only lane or a right-turn-only lane, prediction module 303 may predict that the vehicle is more likely to make a left turn or right turn, respectively.

The prediction module 303 may calculate predictions of one or more metrics. For example, in one or more embodiments, the prediction module may determine a rate of deceleration or stop distance based on the braking system control parameters 315 to determine a safe zone for driving at a desired speed. For example, some obstacles/vehicles, road conditions, and/or safety conditions (e.g., open door) may cause the prediction module 303 to steer or decelerate to maintain safety. The braking control parameters 315 may include recorded deceleration data indicating an upper limit and/or environment-correlated deceleration rates. In one or more embodiments, the braking system control parameters 315 may be used by one or more braking systems (e.g., PBS, SBS, EPB, etc.).

For each of the objects, decision module 304 may make a decision regarding how to handle the object. For example, for a particular object (e.g., another vehicle in a crossing route) as well as its metadata describing the object (e.g., a speed, direction, turning angle, etc.), decision module 304 may decide how to encounter the object (e.g., overtake, yield, stop, pass, etc.). Decision module 304 may make such decisions according to a set of rules, such as traffic rules or driving rules 312, which may be stored in persistent storage device 352.

In one or more embodiments, routing module 307 is configured to provide one or more routes or paths from a starting point to a destination point. For a given trip from a start location to a destination location, for example, received from a user, routing module 307 obtains route and map information 311 and determines all possible routes or paths from the starting location to reach the destination location. Routing module 307 may generate a reference line in a form of a topographic map for each of the routes it determines from the starting location to reach the destination location. A reference line refers to an ideal route or path without any interference from others such as other vehicles, obstacles, or traffic conditions. That is, if there is no other vehicle, pedestrians, or obstacles on the road, an ADV should exactly or closely follow the reference line. The topographic maps are then provided to decision module 304 and/or planning module 305. Decision module 304 and/or planning module 305 examine all of the possible routes to select and modify one of the most optimal routes in view of other data provided by other modules such as traffic conditions from localization module 301, driving environment perceived by perception module 302, and traffic condition predicted by prediction module 303. The actual path or route for controlling the ADV may be close to or different from the reference line provided by routing module 307 dependent upon the specific driving environment at the point in time.

Based on a decision for each of the objects perceived, planning module 305 plans a path or route for the ADV, as well as driving parameters (e.g., distance, speed, and/or turning angle), using a reference line provided by routing module 307 as a basis. That is, for a given object, the decision module 304 decides what to do with the object, while planning module 305 determines how to do it. For example, for a given object, decision module 304 may decide to pass the object, while planning module 305 may determine whether to pass on the left side or right side of the object. Planning and control data is generated by planning module 305 including information describing how vehicle 300 would move in a next moving cycle (e.g., next route/path segment). For example, the planning and control data may instruct vehicle 300 to move 10 meters at a speed of 30 miles per hour (mph), then change to a right lane at the speed of 25 mph.

Based on the planning and control data, control module 306 controls and drives the ADV, by sending proper commands or signals to vehicle control system 111, according to a route or path defined by the planning and control data. In one or more embodiments, the planning and control data include sufficient information to drive the vehicle from a first point to a second point of a route or path using appropriate vehicle settings or driving parameters (e.g., throttle, braking, steering commands, etc.) at different points in time along the path or route.

In one or more embodiments, the planning phase is performed in a number of planning cycles, also referred to as driving cycles, such as, for example, in every time interval of 100 milliseconds (ms). For each of the planning cycles or driving cycles, one or more control commands may be issued based on the planning and control data. That is, for every 100 ms, planning module 305 plans a next route segment or path segment, for example, including a target position and the time required for the ADV to reach the target position. Alternatively, planning module 305 may further specify the specific speed, direction, and/or steering angle, etc. In one or more embodiments, planning module 305 plans a route segment or path segment for the next predetermined period of time such as 5 seconds. For each planning cycle, planning module 305 plans a target position for the current cycle (e.g., the next 5 seconds) based on a target position planned in a previous cycle. Control module 306 may then generate one or more control commands (e.g., throttle, brake, steering control commands, etc.) based on the planning and control data of the current cycle.

Note that decision module 304 and planning module 305 may be integrated as an integrated module. Decision module 304/planning module 305 may include a navigation system or functionalities of a navigation system to determine a driving path for the ADV. For example, the navigation system may determine a series of speeds and directional headings to affect the movement of the ADV along a path that substantially avoids perceived obstacles while generally advancing the ADV along a roadway-based path leading to an ultimate destination. The destination may be set according to user inputs via user interface system 113. The navigation system may update the driving path dynamically while the ADV is in operation. The navigation system may incorporate data from a GPS system and one or more maps to determine the driving path for the ADV.

Figure 4A:
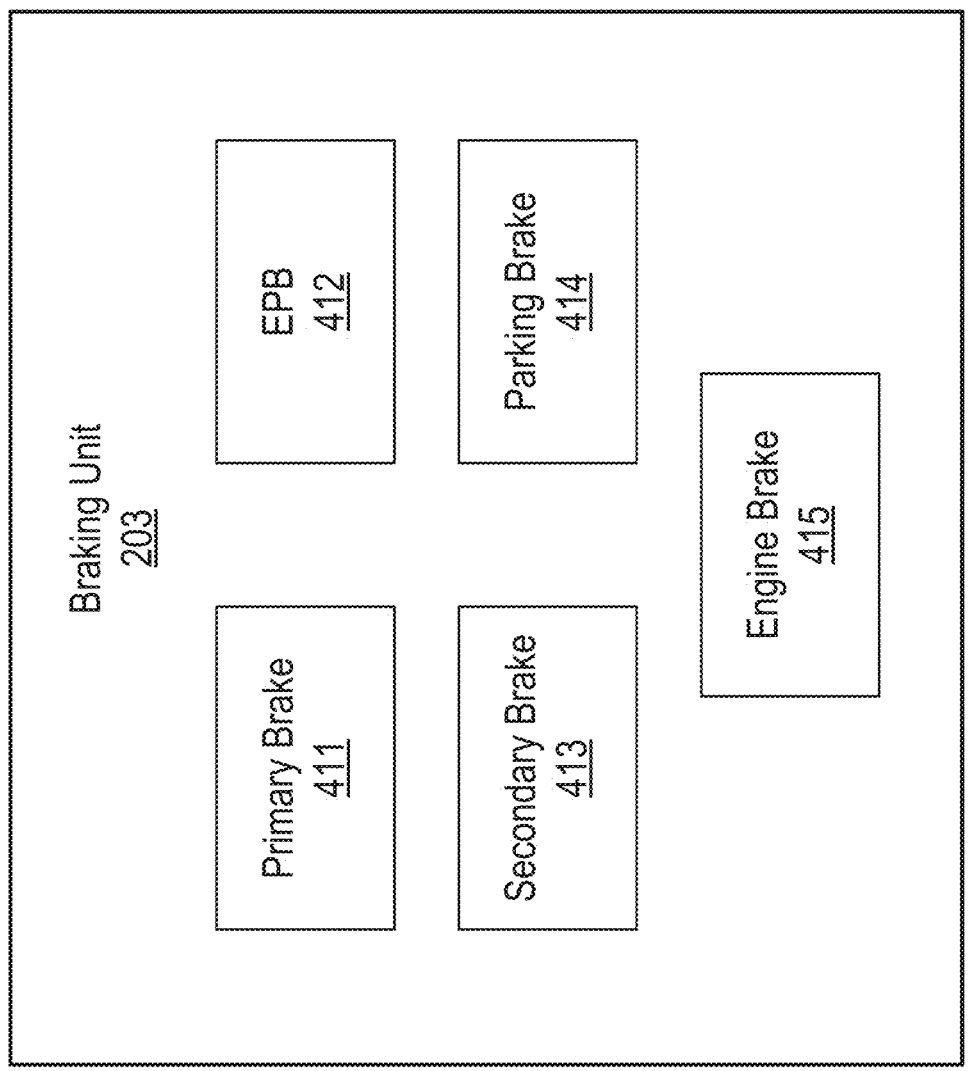
FIGS. 4A-C are block diagrams related to a braking unit and braking systems of an autonomous driving vehicle, according to embodiments of the present disclosure.
Figure 4B:
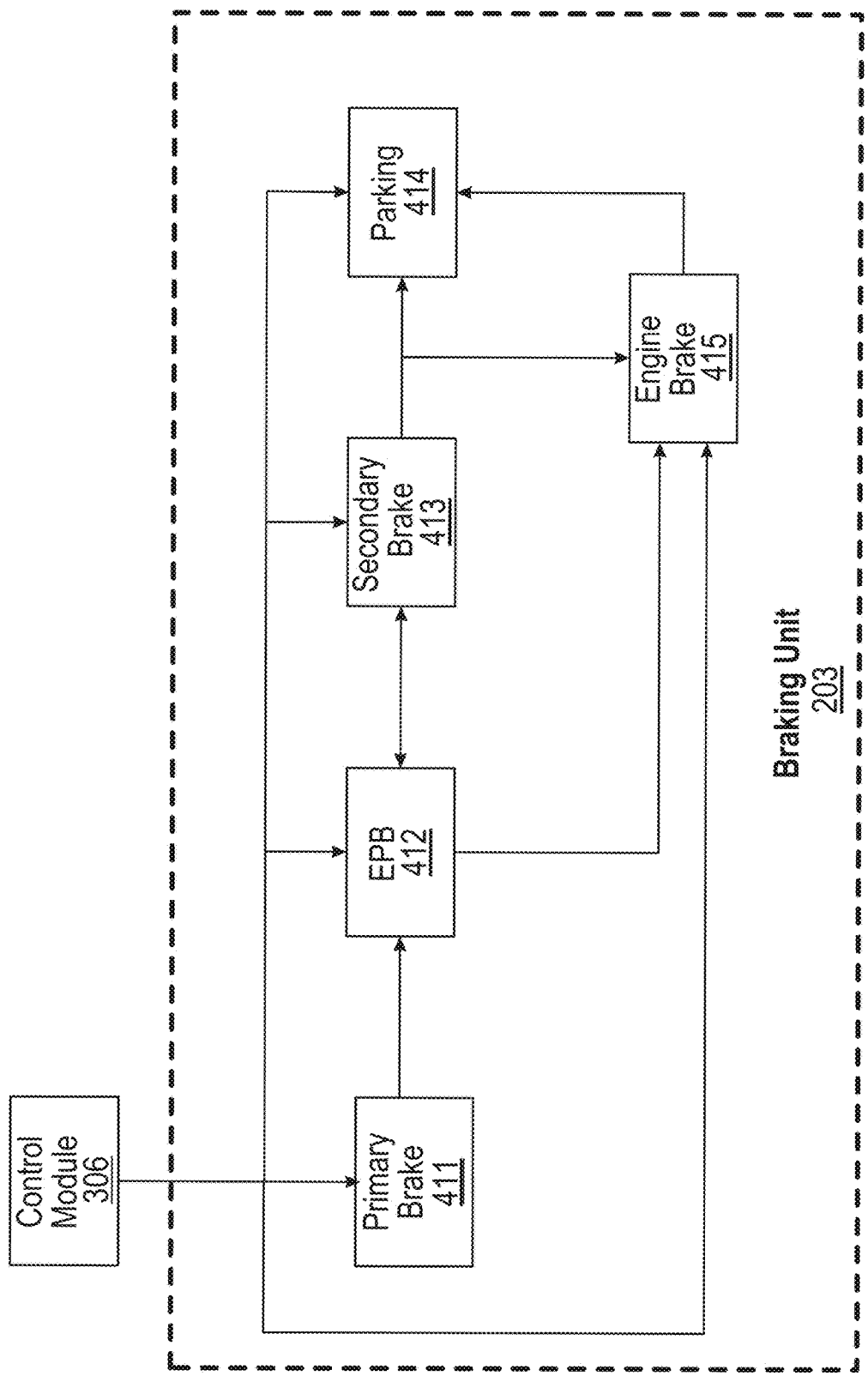

FIGS. 4A and 4B are block diagrams illustrating an example of a braking unit of a control system of an autonomous driving vehicle, according to embodiments of the present disclosure. Referring to FIG. 4A, braking unit 203 includes, but is not limited to, primary brake 411, EPB 412, secondary brake 413, parking 414, and/or engine brake 415. Some or all of brakes 411-415 may be implemented in hardware, software, or a combination thereof. Note that some or all of the brakes 411-415 may be communicatively coupled to or integrated with some or all of the other units of vehicle control system 111 in FIG. 2.

The primary brake 411 may control the speed of the ADV, stop the ADV, or hold the ADV to a standstill (remain stationary). The primary brake 411 may be the rear brakes, which may be used as the first defense to prevent the ADV from rolling. The primary brake 411 may be held safely; however, the primary brake may have timeout limitations (i.e., limits on how long it can hold or sustain braking pressure). The EPB 412 may be activated with a button (instead of a lever) and the brake pads may be electrically applied to the wheels of the ADV. However, the speed at which the EPB 412 activates may be slow (e.g., it may take up to two seconds for the calibers to be fully activated). The EPB may also have noise issues, which creates a negative user experience. In one or more embodiments, the secondary brake 413 may be used in the event of failure of the primary brake 411. The secondary brake 413 may be the front brakes, often pressure restricted in order to prevent the front wheels lockup and subsequent loss of steering. The secondary brake 413 may not be able to hold a high pressure for a time period exceeding a threshold, for example, 10 seconds. The secondary brake 413 may also generate noise issues. The parking brake 414 may keep a parked vehicle stationary, and the parking brake 414 may prevent the ADV from rolling down a hill or moving while at a standstill. However, it may not be safe for the parking brake 414 to hold too much weight particularly when implemented using the transmission as it may cause damage to the transmission and cause parking failure. In one or more embodiments, the ADV cannot drive with the parking brake on, which may cause damage to the braking unit. The ADV may need to shift from the status of "parking," in which the parking brake is on, to the status of "drive," in which the parking brake is off, in order to drive. However, the shifting mechanism may be complex. In one or more embodiments, the engine brake 415 may be used to reduce the speed of the ADV. In one or more embodiments, the engine brake 415 may be used as a last defense when all other brakes have failed; however, it may be used at other times as well for braking.

Referring to FIG. 4B, the braking unit may be configured to perform a redundant holding control to balance the safety and the occupant or passenger comfort of the ADV. For example, the brake unit may be configured to hold the ADV on a slope. Different actions may be performed based on different vehicle statuses of the ADV. In one or more embodiments, the control module 306 controls and drives the ADV, by sending proper commands or signals to the vehicle control system 111 including the braking unit 203. The control module 306 and the brake unit 203 may perform the redundant holding control.

In one or more embodiments, the primary brake 411 may be used to add the wheel pressure, and a warning message may be generated. For example, the primary brake 411 may be used to add the wheel pressure in a first predetermined rate threshold range based on the status of the ADV being in a first status and/or road conditions. For example, the status of the ADV may include a rolling speed of the ADV. The status of the ADV may include a distance between the ADV and an obstacle, for example, which may be the closest obstacle behind when the ADV is rolling back or the closest obstacle ahead of the ADV when the ADV is rolling forward. The status of the ADV may include a mass of the ADV, for example. The road condition may include the friction of the road, the slope gradient of the road, etc. The status of the ADV may include a safety element, such as a door being open.

Figure 4C:
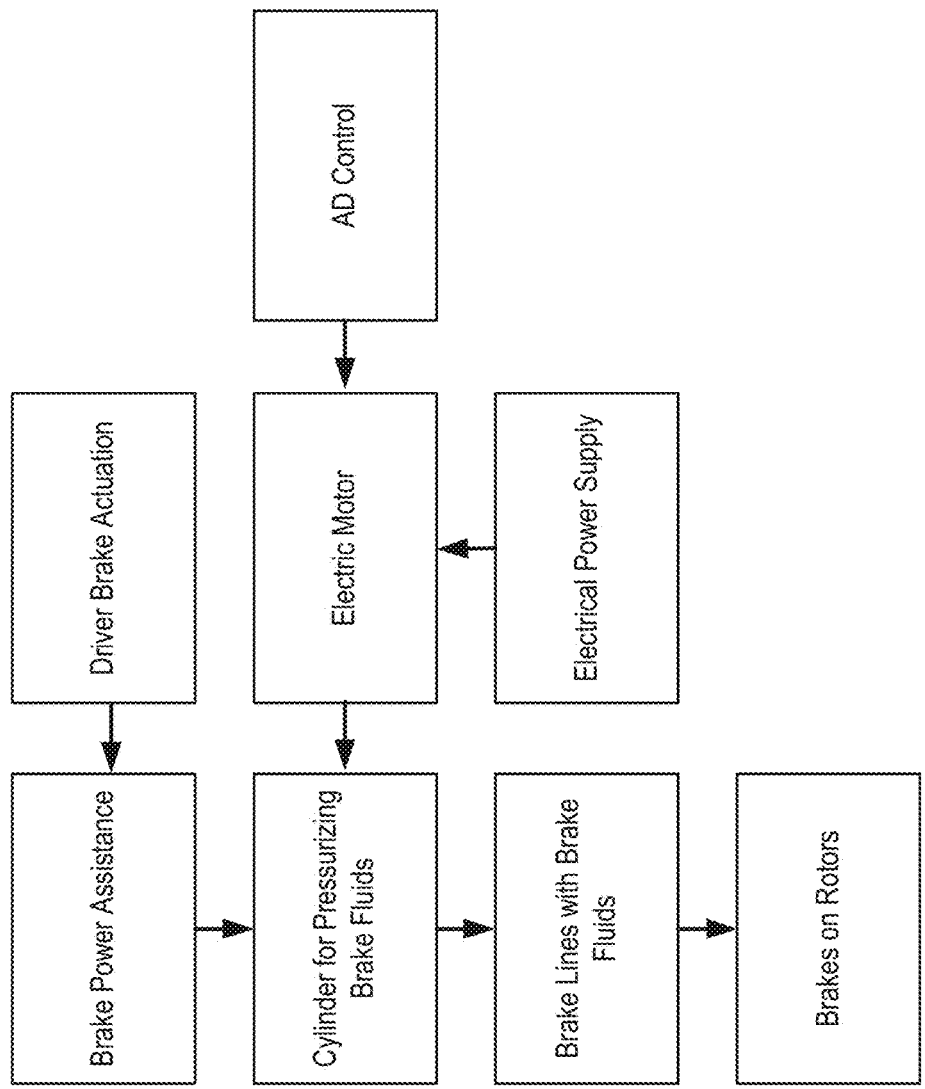

The brake control module 308 of FIG. 3A may be in control of an example brake system 490 of FIG. 4C. FIG. 4C depicts an alternative block diagram view of an example of the braking system 490, according to embodiments of the present disclosure. As shown in FIG. 4C, the braking system 409 includes at least a mechanism for receiving a braking actuation from a driver, a device for providing brake power assistance (e.g., a booster), a cylinder for pressurizing brake fluids, an electrical motor on the master cylinder, one or more brake lines with brake fluids for transmitting braking power to one or more brakes on rotors of the vehicle. The braking system 400 may also include an electrical power supply, independent from or shared with the vehicle. The braking system 490 may include or be in connection with the AD control that operates on the mentioned components/devices with sensor feedback therefrom.

Although illustrated separately, the device providing brake power assistance and the electric motor on the master cylinder may be integrated into a common device. For example, the brake actuation by the driver may provide direct actuation to the electric motor on the master cylinder. In other embodiments, the brake power assistance device may be a separate or independent (e.g., hydraulic) system to provide secondary control of the master cylinder, such as for emergency engagement when AD control does not operate as intended. As discussed herein, the brake control module 308 may reduce the power consumption by the electric motor on the master cylinder to conserve energy when the vehicle performs a traffic stop on a slope or gradient.

Figure 5:
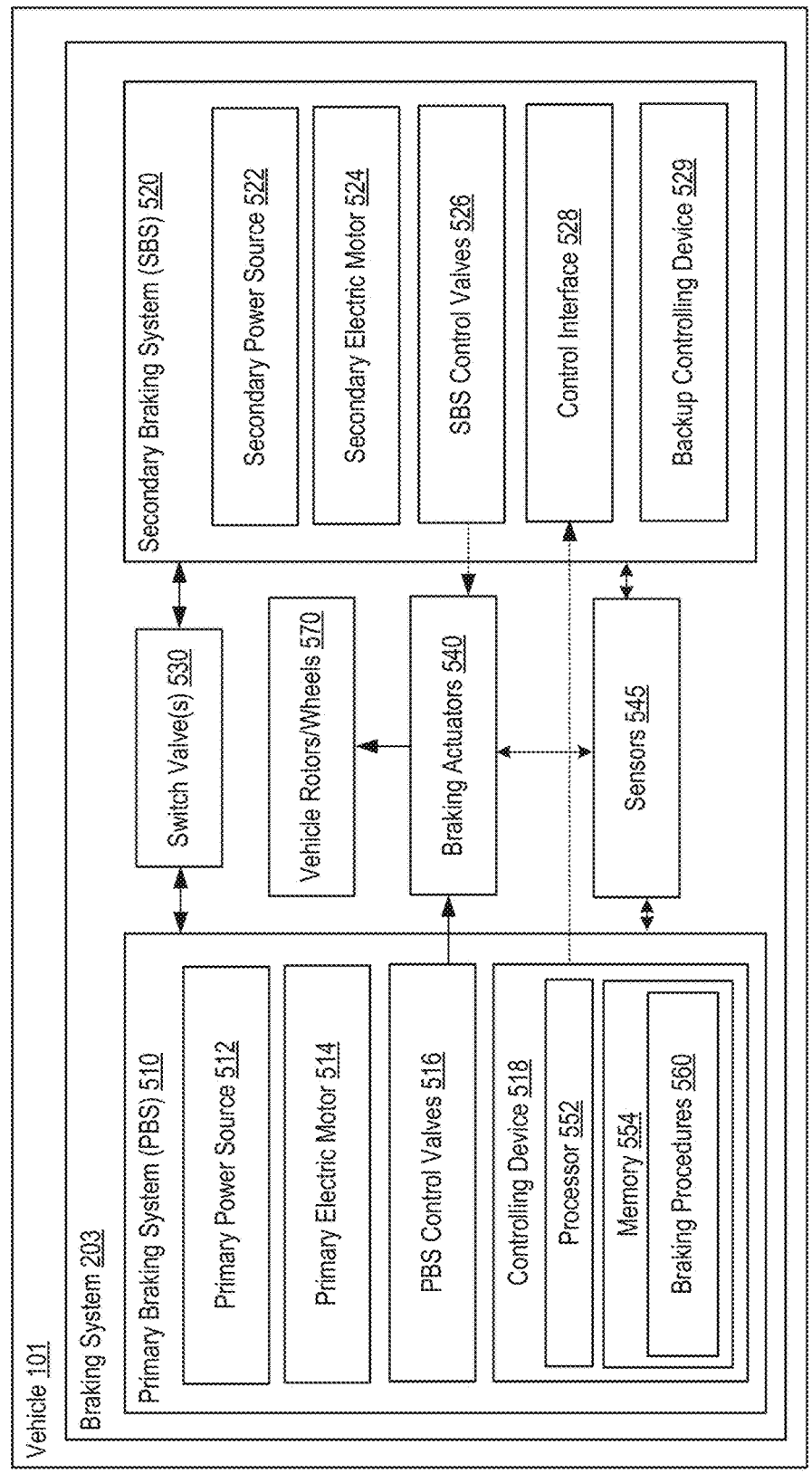
FIG. 5 is a block diagram illustrating implementations of a primary braking system (PBS) and a secondary braking system (SBS), in accordance with aspects of the present disclosure.

FIG. 5 is a block diagram 500 illustrating implementations of a primary braking system (PBS) 510 and a secondary braking system (SBS) 520, in accordance with aspects of the present disclosure. As shown, the ADV 101 includes the braking system 203, which includes the PBS 510 and the SBS 520. The braking system 203 also includes a number of switch valves 530 operable to switch between the PBS 510 and the SBS 520. The braking system 203 includes a number of braking actuators 540, each braking actuator 540 operable to apply a braking pressure on a rotor or wheel 570 of the ADV 101 to generate frictional forces to decelerate or stop the rotation thereof. The braking system 203 includes a number of sensors 545 for monitoring the operating conditions of the PBS 510, the SBS 520, the braking actuators 540, and other aspects of the braking system 203 and the vehicle 101 (e.g., rotations of the rotors or wheels 570, the switch valves 530, the orientations and rotations of the vehicle 101, etc.).

The PBS 510 may be powered by a primary power source 512. The PBS 510 may include a primary electric motor 514 to generate a primary pressure (e.g., hydraulic or pneumatic) to provide hydraulic or pneumatic power to the braking actuators 540. The PBS 510 may include a number of PBS control valves that receive the hydraulic or pneumatic power and are operable to vary respective actuating braking pressures at the braking actuators 540. The PBS 510 includes a controlling device 518 to operate the PBS control valves 516 for varying the respective actuating braking pressures at the braking actuators 540 during different braking procedures. For example, the controlling device 518 controls the braking actuators 540 to independently perform primary braking procedures including at least: (1) a primary longitudinal control, (2) a primary stability control, and (3) a primary standstill control. The sensors 545 may monitor the primary braking procedures and detect when the braking procedure and/or a related component malfunctions.

The braking system 203 may include at least one switch valve 530 configured to switch the PBS 510 to the SBS 520 upon detecting, by the controlling device 518 via the sensors 545, that at least one of the primary braking procedures is malfunctioning. The controlling device 518 may include a processor 552 and a non-transitory memory 554 coupled to the processor 552. The memory 554 may include instructions for the controlling device 518 to cause the PBS 510 or the SBS 520 to perform braking procedures 560 (e.g., primary braking procedures and backup/secondary braking procedures).

As shown in FIG. 5, the SBS 520 is independent from the PBS 510 and may include a secondary power source 522 and a secondary electric motor 524. The secondary electric motor 524 is independent from the primary electric motor 514. The SBS 520 may include a number of SBS control valves 526, which are configured to operate the braking actuators 540. For example, the SBS 520 may use the secondary electric motor 524 to generate a second pressure providing the hydraulic power. The SBS 520 switches at least one switch valve 530 to operate the braking actuators 540. As such, the SBS 520 may control the braking actuators 540 independently from the PBS 510.

In one or more embodiments, the SBS control valves 526 are controlled by the controlling device 518 and are operable to independently provide backup braking procedures at the braking actuators 540. The SBS 520 may also include a backup controlling device 529 to perform the braking control procedures in case the controlling device 518 fails. The SBS 520 may include a control interface 528 for the controlling device 518 to engage various components (e.g., the SBS control valves 526) of the SBS 520. In one or more embodiments, the control interface 528 may allow the backup controlling device 529 to synchronize control parameters with the controlling device 518. When the SBS 520 is engaged, the controlling device 518 may cause the SBS 520 to perform backup braking procedures corresponding to the malfunctioning of at least one of the primary braking procedures.

In one or more embodiments, the memory 554 coupled to the processor 552 stores instructions that are executable by the processor 552. The instructions, when executed, may cause the processor 552 to receive data about obstacle conditions and road conditions. When conditions for braking are detected or satisfied, the processor 552 may disengage a power supply to one or more motors of the vehicle 101 based on the data of obstacle conditions and road conditions. The one or more motors may include at least one electric motor or an internal combustion engine. The processor 552 may then engage the first braking sub-system of the braking system to perform one or more of the primary braking procedures by default. Upon detecting that at least one of the primary braking procedures is malfunctioning by the controlling device 518 via the sensors 545, the controlling device 518 engages the SBS 520 to provide for a backup braking procedure corresponding to the malfunctioning primary braking procedure.

As shown in FIG. 5, the PBS control valves 516 and the SBS control valves 526 may respectively and independently control each of the braking actuators 540. Each of the braking actuators 540 respectively provides braking forces on each rotor or wheel 570 of the ADV 101. In one or more embodiments, the processor 552 and the memory 554 of the controlling device 518 are further configured to receive sensor data of rotation of each wheel of the ADV 101, and individually control, via the SBS control valves 526 each of the braking actuators 540 to perform various braking procedures. For example, the SBS 520 increases, in a secondary longitudinal control (e.g., AEB), a braking pressure when an emergency condition has been detected (e.g., imminent impact). The backup controlling device 529 may include a similar processor and memory as the processor 552 and the memory 554 of the controlling device 518 to provide backup braking procedures in case the controlling device 518 malfunctions.

In one or more embodiments, the SBS 520 may increase, in the secondary longitudinal control (e.g., ACC), the braking pressure to slow down the ADV 101 when a speed difference between the computer-assisted driving vehicle and one or more surrounding vehicles exceeds a threshold value (e.g., due to downhill accelerations).

In one or more embodiments, the SBS 520 may reduce, in a secondary stability control (e.g., ABS), a braking pressure (e.g., via one of the braking actuators 540) on at least one wheel 570 when the at least one wheel 570 rotates slower than other wheels to indicate locking, as measured by one of the sensors 545.

In one or more embodiments, the SBS 520 increases, in the secondary stability control (e.g., ESC), a braking pressure on at least one wheel when a difference between a desired steering direction and a measured steering direction exceeds a threshold value (e.g., understeering or oversteering).

In one or more embodiments, the SBS 520 engages, in a secondary standstill control (e.g., HAS), a parking brake when an unintended wheel rotation has been detected. The parking brake applies a braking force for holding the ADV 101 still.

In aspects, the switch valves 530 may include a first actuation valve operable to separate the second braking sub-system from the first braking sub-system that comprises a master cylinder, when the second braking sub-system is engaged upon detecting, by the controlling device via the plurality of sensors, that at least one of the primary braking procedures is malfunctioning. The first actuation valve prevents the first pressure from applying to the second braking sub-system by switching from a primary position to a secondary position. For example, in the primary position, the first actuation valve provides hydraulic fluids from a master cylinder and a booster cylinder to the first plurality of valves; and in the secondary position, the first actuation valve shuts off hydraulic fluids from the master cylinder.

In one or more embodiments, the at least one switch valve 530 further includes a second actuation valve operable to switch between a free-flow position and a check valve position. The free-flow position is used during the engagement of the second braking sub-system for receiving hydraulic fluids from the booster cylinder.

In aspects, the braking actuators 540 include a front-left braking actuator operable to apply a braking force on a front-left wheel of the computer-assisted driving vehicle; a front-right braking actuator operable to apply a braking force on a front-right wheel of the computer-assisted driving vehicle; a rear-left braking actuator operable to apply a braking force on a rear-left wheel of the computer-assisted driving vehicle; and a rear-right braking actuator operable to apply a braking force on a rear-right wheel of the computer-assisted driving vehicle. The PBS control valves 516 and the SBS control valves 526 are respectively operable to independently vary corresponding braking forces on the front-left, front-right, rear-left, and rear-right wheels. In one or more embodiments, the rear-left braking actuator and the rear-right braking actuator further include an electronic parking brake (EPB) respectively, or jointly. For example, the EPB may be actuated to apply a braking pressure without continuous consumption of electricity.

Figure 6A:
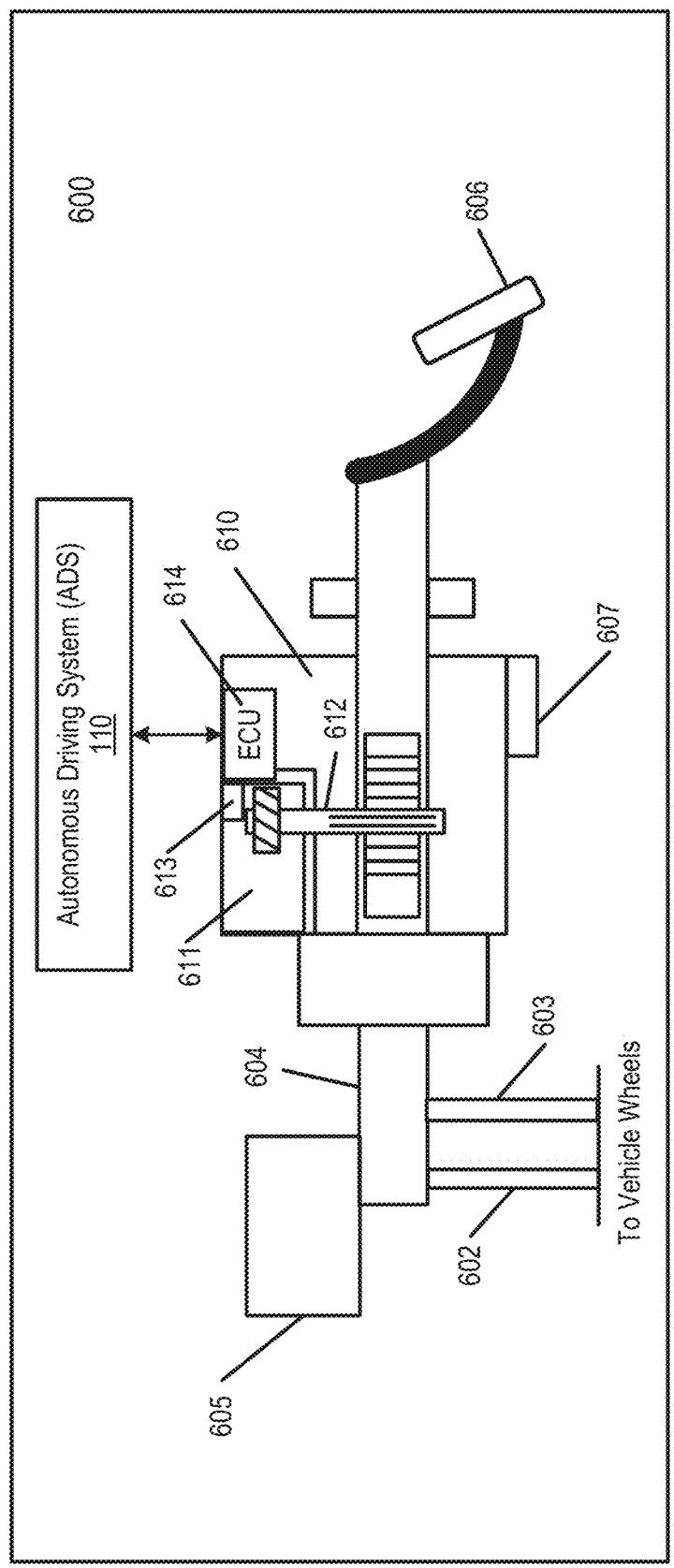
FIG. 6A shows a representation of a hydraulic brake system for a vehicle, according to embodiments of the present disclosure.

FIG. 6A shows a representation of a hydraulic brake system 600 for a vehicle, according to embodiments of the present disclosure. The vehicle brake system 600 may include a front axle brake circuit 602 and a rear axle brake circuit 603 for actuating wheel brake devices (not shown) for the wheels of the ADV using a brake fluid that is under hydraulic pressure. Brake circuits 602 and 603 may be connected to master brake cylinder 604 which is supplied with the brake fluid by a brake fluid reservoir container 605. A master brake cylinder piston within master brake cylinder 604 is operable via brake pedal 606.

In one or more embodiments, the brake system 600 includes a braking force booster 610 that is coupled between brake pedal 606 and master brake cylinder 604. Booster 410 may include an electric motor 611, mechanical gearbox 612, and an electronic control unit (ECU) 614. In one or more embodiments, ECU 614 comprises a microcontroller that controls the actuations of booster 610. Booster 610 may boost a brake control that is applied by an operator. For example, a brake pedal travel distance that is exerted by an operator may be measured by a pedal travel sensor 607. A signal of pedal travel sensor 607 may be transmitted from ADS 110 to ECU 614 of booster 610 to cause gears of a mechanical gearbox 612 to rotate thereby boosting the applied brake pedal and causing the hydraulic brake pressure at master brake cylinder 604 to increase. In one or more embodiments, the actuation position of electric motor 611 may be measured by an actuation sensor 613.

In one or more embodiments, brake fluid may be carried in each brake circuit 602 and 603 and is supplied to brake devices (not shown) of the vehicle wheels. The brake hydraulics may further include a hydraulic pump (not shown) to control the hydraulic brake pressure of the brake hydraulics.

For an autonomous driving mode, an ADS may request brake controls (e.g., a pedal travel distance) by sending a signal from ADS 110 to ECU 614 of booster 610 to cause gears of the mechanical gearbox 612 to rotate and to actuate the piston of the master brake cylinder 604. Furthermore, a brake control system may obtain sensor values from ECU 614 of booster 610 to obtain measurements of travel sensor 607 and/or actuation sensor 613.

In one or more embodiments, ADS 110 may provide information to ECU 614 to apply accurate brake hold pressure while ADV 101 is stopped on a gradient or at other times. Referring to FIG. 3B, planning module 305, control module 306, and/or other modules may perform the computations, determinations, and steps required to instruct the braking system (e.g., ECU 614) of the accurate brake hold pressure.

Although the vehicle brake hydraulics system is described with brake fluid hydraulics, the embodiments are not limited to fluid hydraulic brakes. For example, an electronic brake system may be used instead of the fluid hydraulics brake system.

Figure 6B:
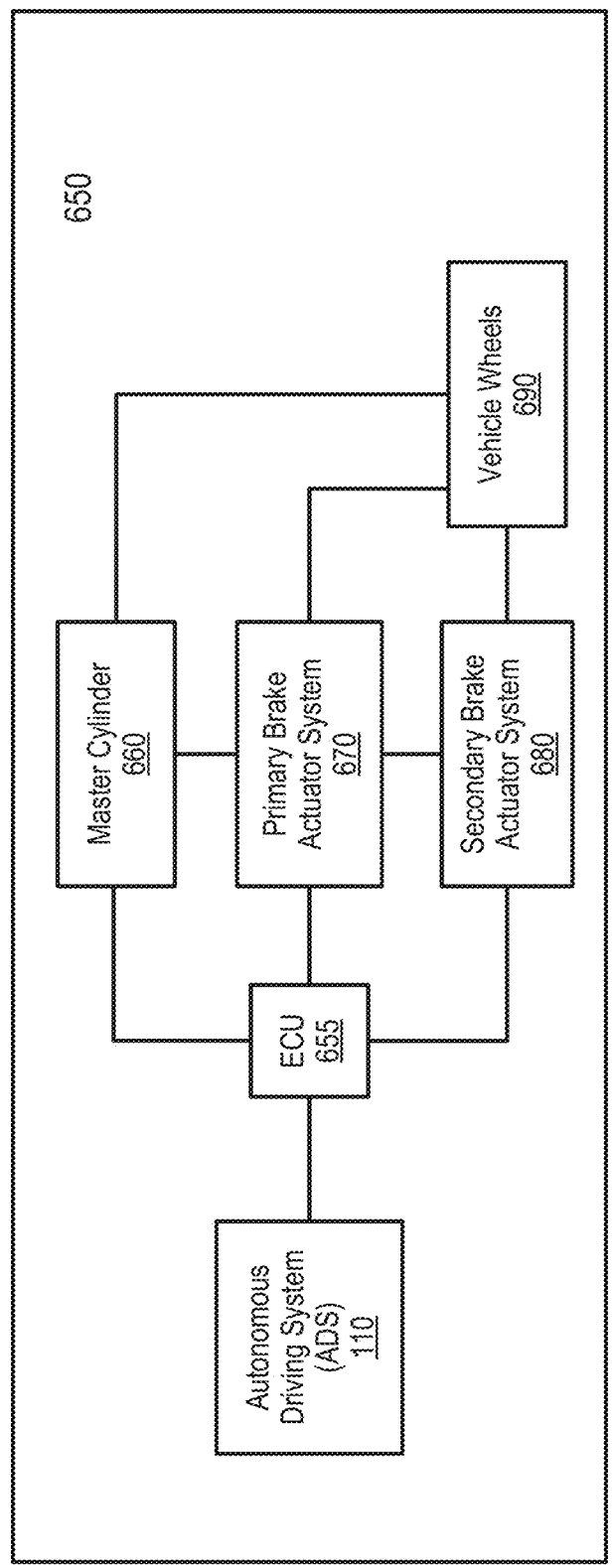
FIG. 6B is a diagram illustrating an example of a redundant Drive-By-Wire (DBW) brake system for a vehicle, according to embodiments of the present disclosure.

FIG. 6B is a diagram illustrating an example of a redundant Drive-By-Wire (DBW) brake system for a vehicle, according to embodiments of the present disclosure. In one or more embodiments, DBW technology in automotive vehicles may replace or supplement traditional mechanical and hydraulic systems with mechatronic actuation and control.

The brake system 650 includes a master cylinder 660 that couples to the primary brake actuator system 670. Similar to that discussed above, ADS 110 provides information to ECU 655 to apply accurate brake hold pressure while ADV 101 is stopped on a gradient or may apply brake hold pressure in other circumstances. In one or more embodiments, the primary brake actuator system 670 includes a travel sensor, motor sensor, and motor. Primary brake actuator system 670 may be coupled to secondary brake actuator system 680. In one or more embodiments, secondary brake actuator system 680 receives brake hold pressure information from primary brake actuator system 670 and applies an appropriate braking force to vehicle wheels 690 accordingly.

Figure 7:
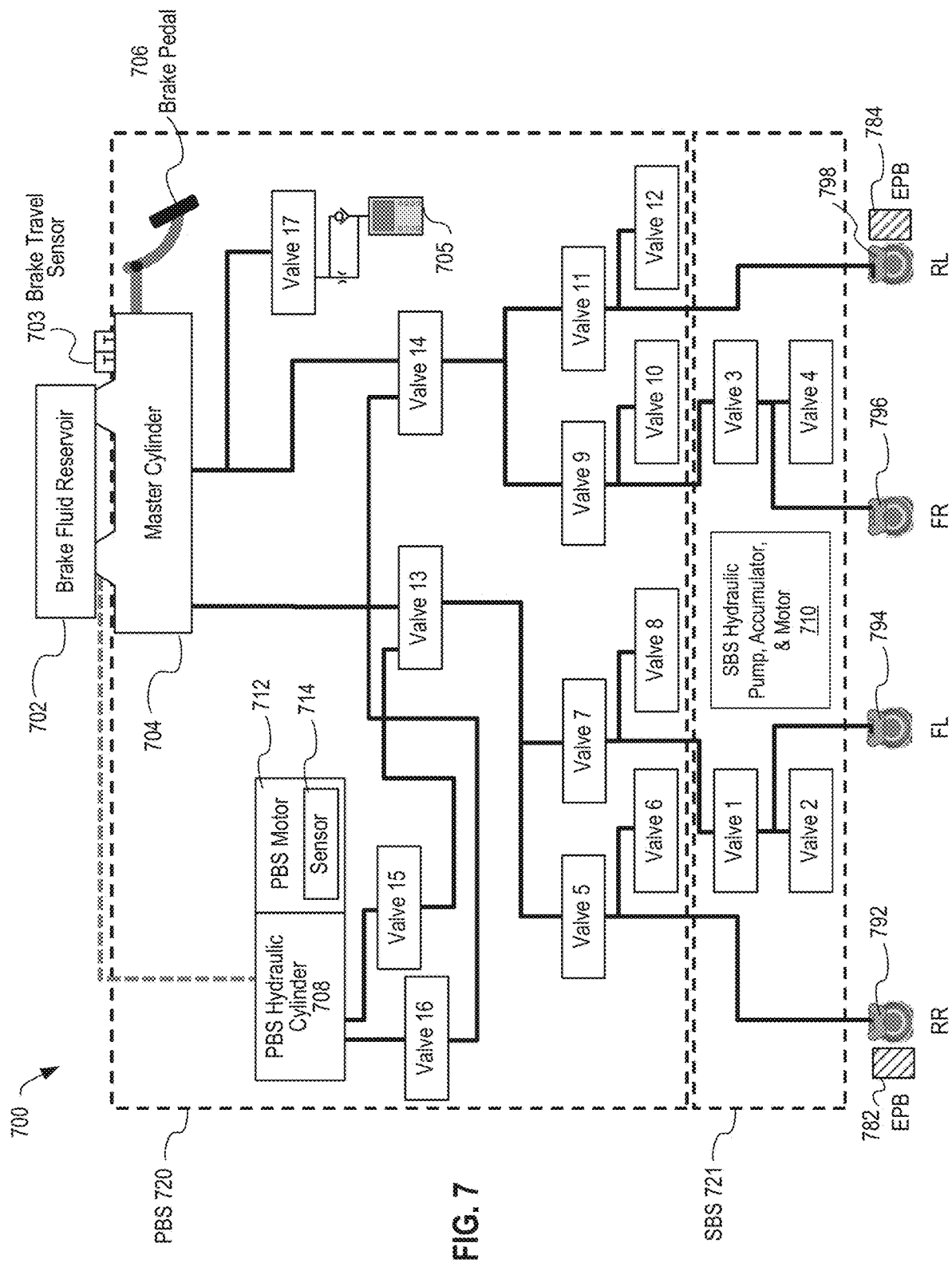
FIG. 7 illustrates an alternative representation of a braking unit (which includes a PBS and an SBS) for a vehicle, according to embodiments of the present disclosure.

FIG. 7 illustrates an alternative example representation of a braking unit 700 including a PBS 720 and a SBS 721, according to embodiments of the present disclosure. For clarity, not all diagram blocks within box 720 belong to the PBS 720. For example, some components illustrated in box 720 may belong to a system level or be shared with the SBS 721.

As shown, the PBS 720 includes a master cylinder 704. The master cylinder 704 might use an optional booster in some embodiments (e.g., the booster may amplify the pressure output of the master cylinder 704). The PBS 720 includes a PBS hydraulic cylinder 708 with a PBS motor 712. One or more sensors 714 may monitor the operating conditions of the PBS motor 712 and the cylinder 708. The SBS 721 includes an SBS hydraulic pump, accumulator, and motor 710 with an SBS motor. One or more sensors (not shown) may monitor the operating conditions of the SBS motor and the SBS hydraulic pump, accumulator, and motor 710. In one or more embodiments, the SBS hydraulic pump, accumulator, and motor 710 and the SBS motor (assembly) may take the form of an ABS brake modulator in which a pump motor is integrated with one or more pumps and valves. The master cylinder 704, the PBS hydraulic cylinder 708, and the SBS hydraulic pump, accumulator, and motor 710 receive brake fluids from the brake fluids reservoir 702 (and return thereto). Also depicted is a brake travel sensor 703 that may be used to determine a brake pedal travel distance of the brake petal 706. A brake pedal travel sensor 703 signal may be transmitted to or from the ADS. Also, depicted in FIG. 7 is a brake pedal simulator 705, which is designed to replicate the driver's experience and is commonly used as a driver feeling simulator; it produces a visco-elastic brake pedal sensation, enhancing the overall realism of the simulation.

The brake fluids transfer braking pressures from the cylinders 704, 708, and 710 to the brake actuators 792, 794, 796, and 798 (e.g., in the forms of pistons and friction pads for clamping down respective rotors to slow down wheel movements). The SBS hydraulic pump, accumulator, and motor 710 may provide backup braking pressures to the PBS hydraulic cylinder 708 when engaged.

In one or more embodiments, the system 700 may include EPB that may affect one or more wheels to apply braking pressure. For example, EPB 782, 784 may be applied to the RR and RL wheels; although it shall be noted that more wheels or different wheels may have EPB applied to them.

Figure 8:
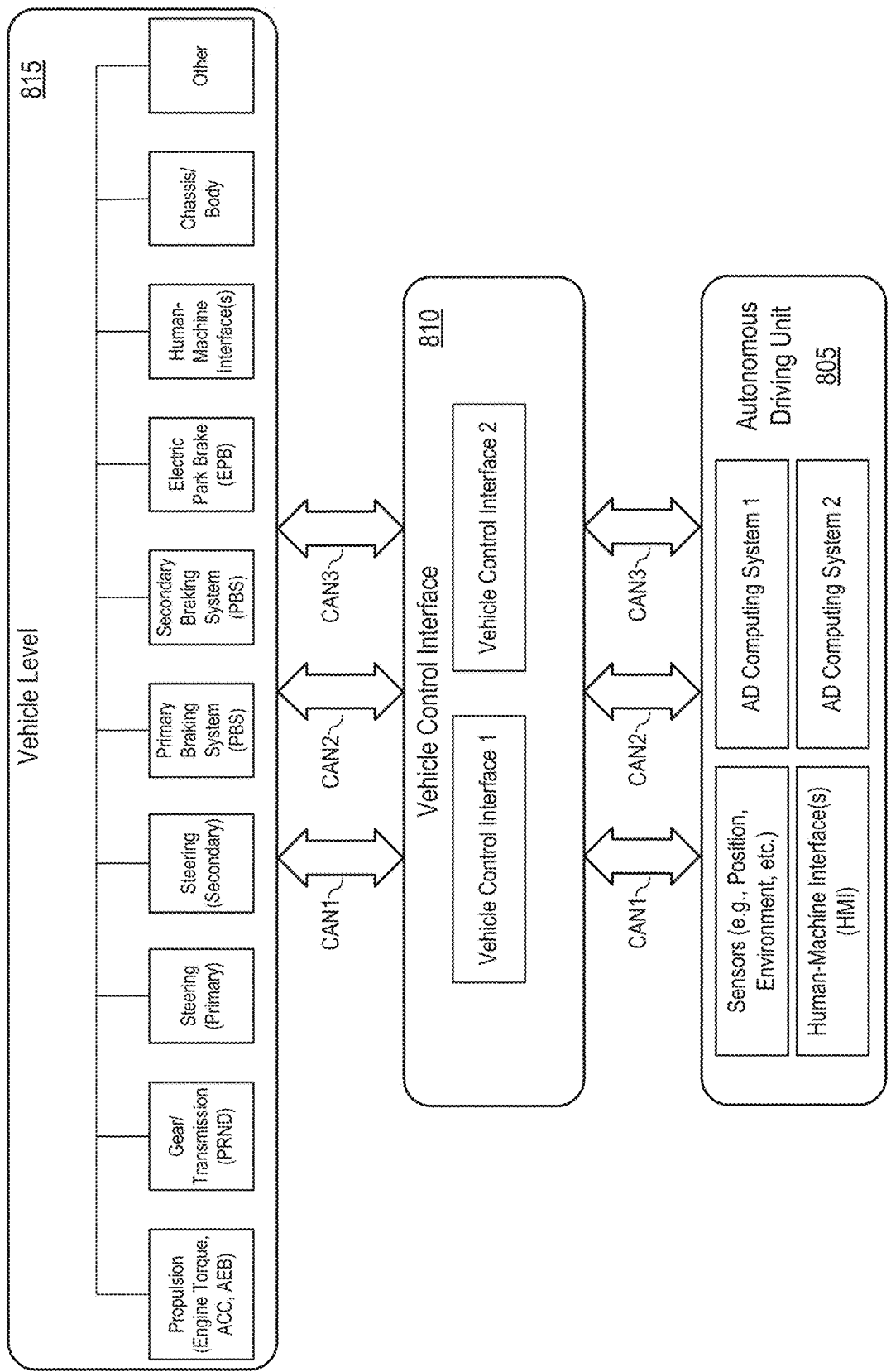
FIG. 8 is a block diagram of an example control system, in accordance with aspects of the present disclosure.

FIG. 8 is a block diagram 800 of an example control system, in accordance with aspects of the present disclosure. As shown, the example control system may include three high-level components: the autonomous driving unit 805, the vehicle control interface 810, and the vehicle level components 815.

The autonomous driving unit 805 may include various sensors (e.g., cameras, microphones, LIDAR, GPS, accelerometers, door sensors, light sensors, proximity sensors, thermal sensors, tilt sensors, etc.). The autonomous driving unit may include one or more autonomous driving computer systems for computing control inputs to the vehicle-level components (e.g., engine, braking system, steering, etc.).

The vehicle control interface 810 allows the sensor information to be provided to the various vehicle-level components 815. For example, a command/output from the AD computer system may be used to actuate two or more components (e.g., steering, and/or brake) at the vehicle level. According to aspects of the present disclosure, handling an open door may be implemented using sensors including one or more motion (or position) sensors, one or more door sensors, and the braking system at the vehicle level.

In one or more embodiments, the vehicle-element elements may include propulsion-related components (or elements), gear/transmission-related components, steering, braking, interfacing, chassis/body, and other elements (e.g., tire pressure sensors and controls). While these vehicle-level components are depicted as being connected or communicatively connected via a single connection, there may be one or more redundant connections; there may also be differently configured connections (i.e., certain components may be on different connection segments than other components).

In one or more embodiments, the braking system includes a primary braking system (PBS) and a secondary braking system (SBS) as a backup system for the primary braking system. For example, the ADV may decelerate using the PBS by implementing a brake torque request method executing a rate of deceleration and/or to hold the vehicle at a standstill/park position. In response to detecting a malfunction of one braking system, the ADV may utilize one or more other braking systems. The vehicle-level components may include various sensors for providing feedback to the respective operations.

Figure 9:
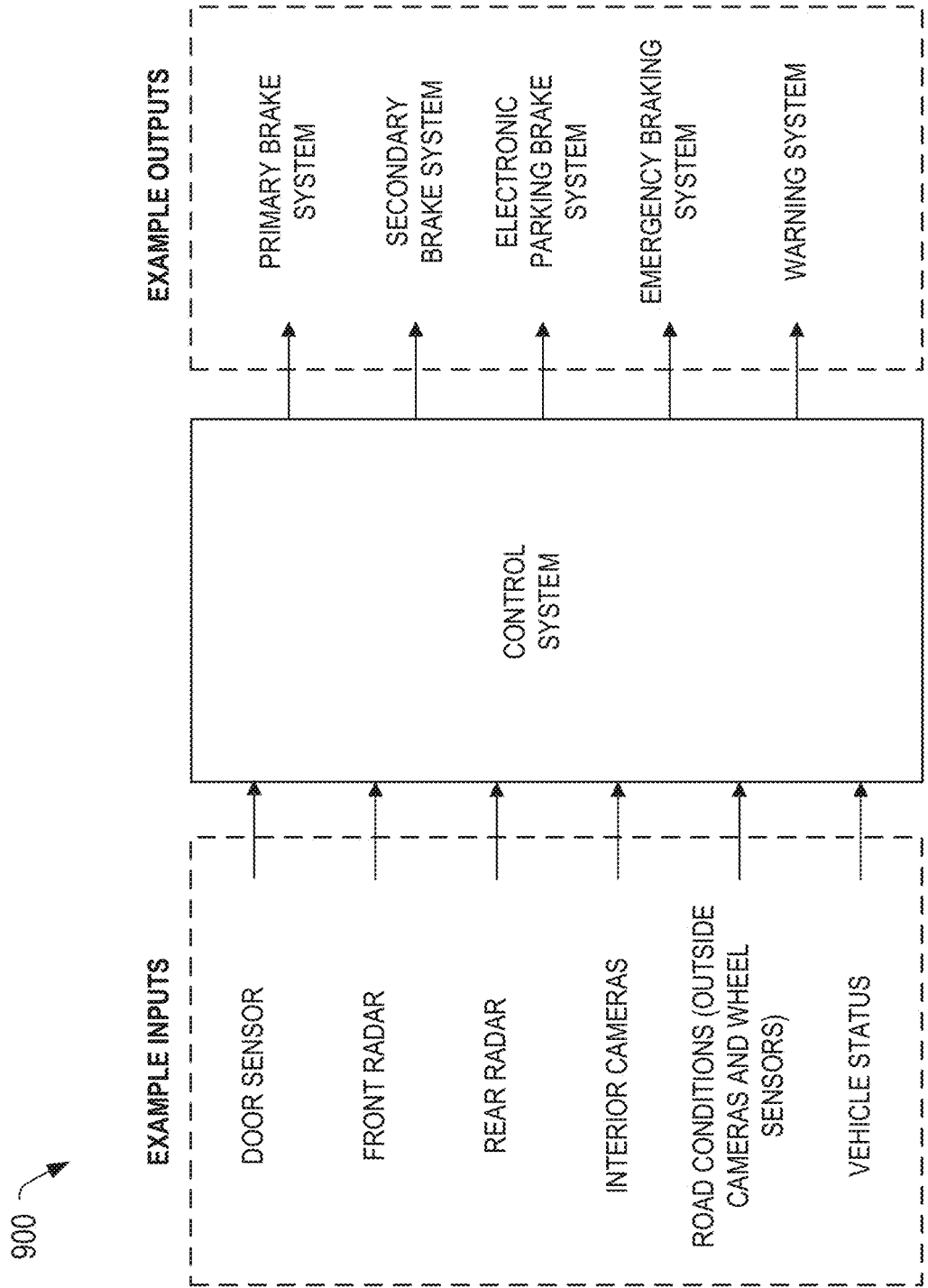
FIG. 9 depicts a block diagram of an alternative example control system, in accordance with aspects of the present disclosure.

FIG. 9 depicts a diagram 900 of an alternative example control system and the associated inputs and outputs, in accordance with aspects of the present disclosure. As shown, the control system may use various measurements or sensor feedback as input. The example inputs include radar (or LIDAR) information of the front and rear of the ADV, imaging information from interior cameras, road conditions captured by exterior cameras and/or wheel sensors, door sensors, and vehicle status (e.g., speed, operation conditions of various systems, such as whether the primary braking system is operating properly, etc.).

Upon determining a status based upon one or more sensor inputs, the control system may provide various example outputs to various systems of the ADV. For example, the example outputs may include control signals to the EPB, the primary brake system, the secondary brake system, an emergency braking system, and warning systems, among others. In one or more embodiments, the control system may utilize the inputs a operate using one or more embodiments related to the handling of an open door or doors of the vehicle.

Note that some or all components as shown and described above may be implemented in software, hardware, or a combination thereof. For example, such components can be implemented as software installed and stored in a persistent storage device, which can be loaded and executed in memory by a processor (not shown) to carry out the processes or operations described throughout this application. Alternatively, such components can be implemented as executable code programmed or embedded into dedicated hardware such as an integrated circuit (e.g., an application-specific IC or ASIC), a digital signal processor (DSP), or a field programmable gate array (FPGA), which can be accessed via a corresponding driver and/or operating system from an application. Furthermore, such components can be implemented as specific hardware logic in a processor or processor core as part of an instruction set accessible by a software component via one or more specific instructions.

Some portions of the preceding detailed descriptions have been presented in terms of methods and symbolic representations of operations on data bits within a computer memory. These descriptions and representations are the ways used by those skilled in the data processing arts to most effectively convey the substance of their work to others skilled in the art. A method may, generally, be conceived to be a self-consistent sequence of operations leading to a desired result or results; the operations may be considered to be those requiring physical manipulations of physical quantities.

It should be borne in mind, however, that all of these and similar terms are to be associated with the appropriate physical quantities and are merely convenient labels applied to these quantities. Unless specifically stated otherwise as apparent from the above discussion, it is appreciated that throughout the description, discussions utilizing terms such as those set forth in the claims below, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

Figure 10:
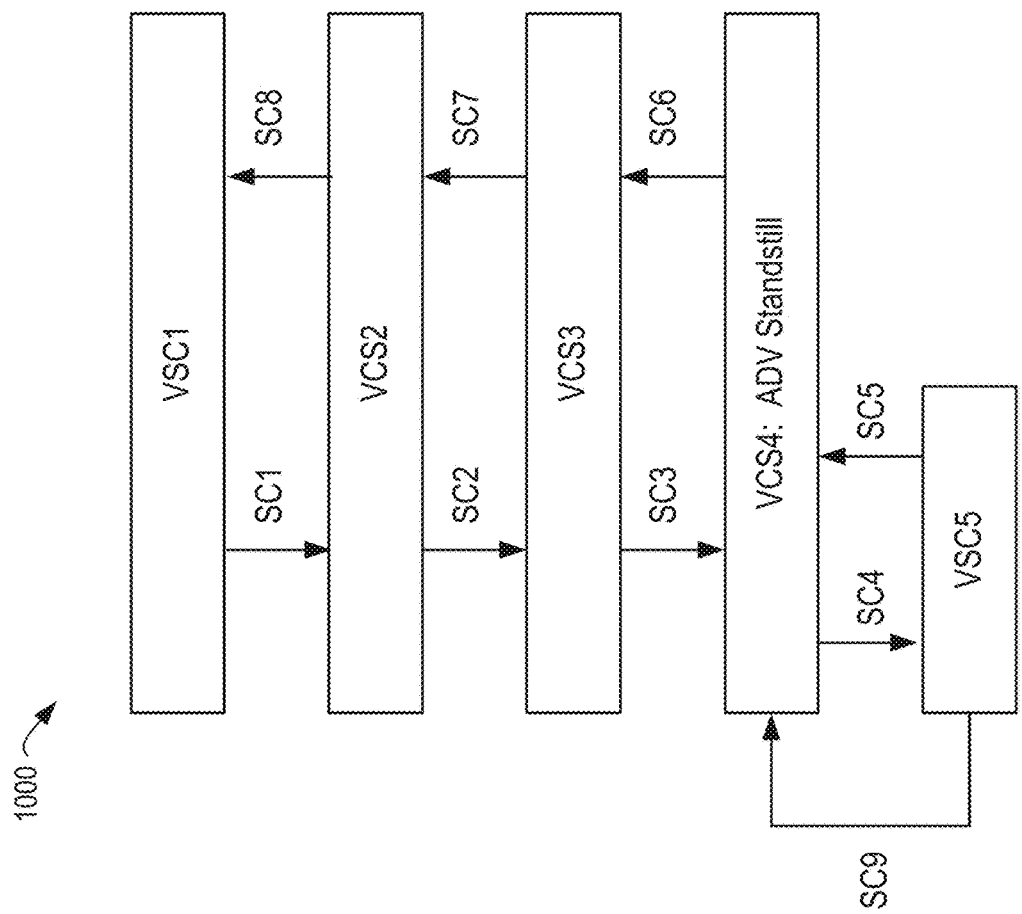
FIG. 10 illustrates a state diagram of an autonomous driving vehicle, according to embodiments of the present disclosure.

FIG. 10 illustrates a state diagram 1000 of an autonomous driving vehicle, according to embodiments of the present disclosure. One or more wheel sensors may be used to detect a very low speed of the ADV when the ADV initially starts rolling. The wheel sensors may generate magnetic pulses in the form of waves, proportional to the speed of the ADV. The ADV may be in different states based on the speed of the ADV, and different control techniques may be applied accordingly.

Referring to FIG. 10, the ADV may be held to a standstill at a state VCS4. One or more of the ADV's wheel sensors, which may be located at each of the wheels (i.e., front left (FL), front right (FR), rear left (RL), rear right (RR) wheel), may be used to detect the rolling speed of the ADV based on pulses detected. In one or more embodiments, when at least two diagonal wheel sensors (e.g., FL & RR or FR & RL) detect pulses within a first time period, a trigger SC4 (where "SC" stands for "status condition") may happen, in which the ADV may change to the state VCS5 (where "VCS" stands for "vehicle control state" or "vehicle condition status") in which the ADV is rolling. For example, the first time period may be 250 ms, 350 ms, 450 ms, 550 ms, 650 ms, or another value. In one or more embodiments, a trigger SC6 from the state VCS4 to a state VCS3 may not be allowed.

While in the state VCS5, when no wheel sensors may detect any pulses for a second period of time, a trigger SC5 may happen, in which the ADV may change back to the state VCS4. However, when the rolling speed is larger than a first speed (e.g., 0.5, 1, or 1.5 kph), a trigger SC9 may happen, in which the state of the ADV may change to the state VCS3. For example, the second time period may be 50 ms, 150 ms, 250 ms, 350 ms, 450 ms, or another value.

While in the state VCS3, when no wheel-sensors may detect any pulses for the second period of time, a trigger SC3 may happen, in which the ADV may change back to the state VCS4; when the rolling speed is larger than a second speed (e.g., 1.5, 2, or 2.5 kph), a trigger SC7 may happen, in which the state of the ADV may change to a state VCS2.

While in the state VCS2, when the rolling speed is less than the second speed (e.g., 1.5, 2, or 2.5 kph), a trigger SC2 may happen, in which the ADV may change back to the state VCS3; when the rolling speed is larger than a third speed (e.g., 5, 6, 7, 8, 9, or 10 kph), a trigger SC8 may happen, in which the state of the ADV may change to a state VCS1. While in the state VCS1, when the rolling speed is less than a fourth speed (e.g., 2, 3, or 4 kph), a trigger SC1 may happen, in which the ADV may change back to the state VCS2.

Different actions (such as different brakes, braking rates, messages, or other actions) may be activated or triggered based on different states of the ADV. For example, when the ADV is at the state VSC5, the redundant holding control may be in the first stage, and the primary brake 411 may be used. When the ADV is at the state VSC3, the redundant holding control may be in the second stage, and the EPB 412 may be activated. When the ADV is at the state VSC2, the redundant holding control may be in the third stage, in which the secondary brake 413 may be activated. When the ADV is at the state VSC1, the redundant holding control may be in the fourth stage, and the engine brake 415 may be activated.

In one or more embodiments, the stages or states may include and/or may be used with respect to a door status (e.g., door going from open-to-closed state or from closed-to-open state). As disclosed in more detail below, different door states and vehicle motion states may be considered for handling an open door.

1. Autonomous Mode Embodiments for Handling an Open Door (or Doors)

Figure 11:
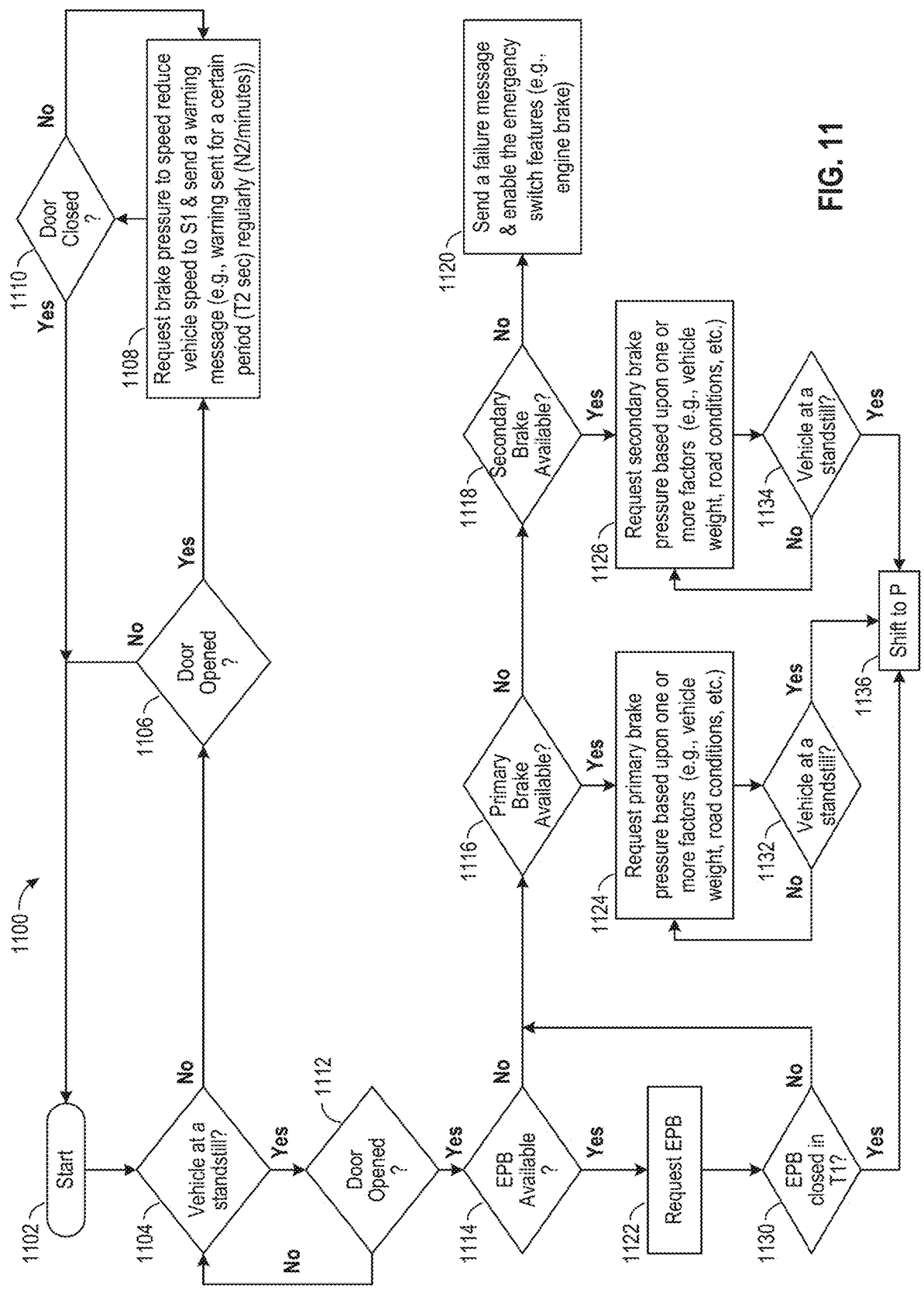
FIG. 11 depicts a method for handling an open door for a vehicle when a control system of the vehicle is in an autonomous control state, according to embodiments of the present disclosure.

FIG. 11 depicts a method for handling an open door for a vehicle when a control system of the vehicle is in an autonomous control state, according to embodiments of the present disclosure.

In one or more embodiments, the process starts (1102) by determining (1104) whether the vehicle is at a standstill. Responsive to detecting, using input from one or more sensors, that the vehicle is not at a standstill (i.e., the vehicle is moving), the process may comprise determining (1106) if a door has been opened. In one or more embodiments, the monitored door or doors may be a set of one or more doors (e.g., driver's door, driver's and front passenger's door, all doors, etc.).

In one or more embodiments, while a door of the vehicle is detected as being open, the system may activate (1108) one or more brake systems to apply braking pressure to reduce the speed of the vehicle to a first speed threshold range (which may be a specific speed, including no speed at all (i.e., stopped)) and triggering a warning signal. The warning signal may have an on-off cycle and may be repeated for a set time interval (e.g., repeated N2 times per minute). The braking and warning signal may continue (1110) until the open door is closed; once closed, the process may return (1102) to the start.

In one or more embodiments, responsive to detecting, using input from one or more sensors, that the vehicle is at a standstill (i.e., not moving), the control system may continually monitor (1112) for an open door. Responsive to detecting a door of the vehicle being opened, the control system may determine (1114), using input from one or more sensors, whether a first brake system (e.g., an electronic parking brake (EPB) system) is available for use. If the first brake system is available for use, the first brake system may be requested to apply (1122) braking pressure to the vehicle to ensure that it safely remains stationary.

In one or more embodiments, the control system of the vehicle may monitor whether the EPB meets (1130) a first condition after causing the first brake system to apply braking pressure. The first condition may be any of a number of conditions, such as whether the EPB has reached a threshold level of braking engagement (e.g., the calibers of the EPB have fully closed) within an EPB engagement threshold time (e.g., within 1-10 seconds).

In one or more embodiments, responsive to the EPB not meeting that first condition, the EPB may be deemed (1130) as not being available for use, and the method may proceed to determine (1116), using input from one or more sensors, whether a second brake system is available for use. In one or more embodiments, the second brake system may be the vehicle's primary braking system. Note that the first brake system may be determined to not be available for use either initially (1114) or because it failed to meet the first condition (1130).

Responsive to determining that the second brake system is available, the second brake system may be requested to apply (1124) braking pressure to the vehicle. In one or more embodiments, the braking pressure may be based on one or more parameters related to the vehicle, such as vehicle weight, road conditions (surface, gradient, traffic conditions, etc.), etc.

In one or more embodiments, the second brake system (e.g., the primary braking system) may be applied (1132) until the vehicle is at a standstill and is placed (1136) into a parked state (e.g., shift vehicle into park). This step may be implemented to prevent the vehicle from rolling forwards or backwards. Note also that engaging the park mode while the vehicle is in motion may cause severe damage to the transmission system; thus, embodiments check that the vehicle is at a standstill before being put into park status.

Responsive to determining that the second brake system (e.g., the vehicle's primary braking system) is not available, a determination may be made (1118), using input from one or more sensors, whether a third brake system is available for use. In one or more embodiments, the third brake system may be the vehicle's secondary braking system.

Responsive to determining that the third brake system is available, the third brake system may be requested to apply (1126) braking pressure to the vehicle. In one or more embodiments, the braking pressure may be based on one or more parameters related to the vehicle, such as vehicle weight, road conditions (surface, gradient, traffic conditions, etc.), etc.

In one or more embodiments, the third brake system (e.g., secondary braking system) may be applied (1134) until the vehicle is at a standstill and is placed (1136) into a parked state (e.g., shift vehicle into park). As noted above, this step may be implemented to prevent the vehicle from rolling forwards or backwards.

In one or more embodiments, responsive to determining that the third brake system is not available, a failure message may be made/triggered (1120) to alert a driver and/or others of the braking failures. Additionally, in one or more embodiments, the control system enables (1120) an emergency braking feature, such as engine braking and/or some other braking feature like a failsafe braking system.

2. Manual Mode Embodiments for Handling an Open Door (or Doors)

Figure 12:
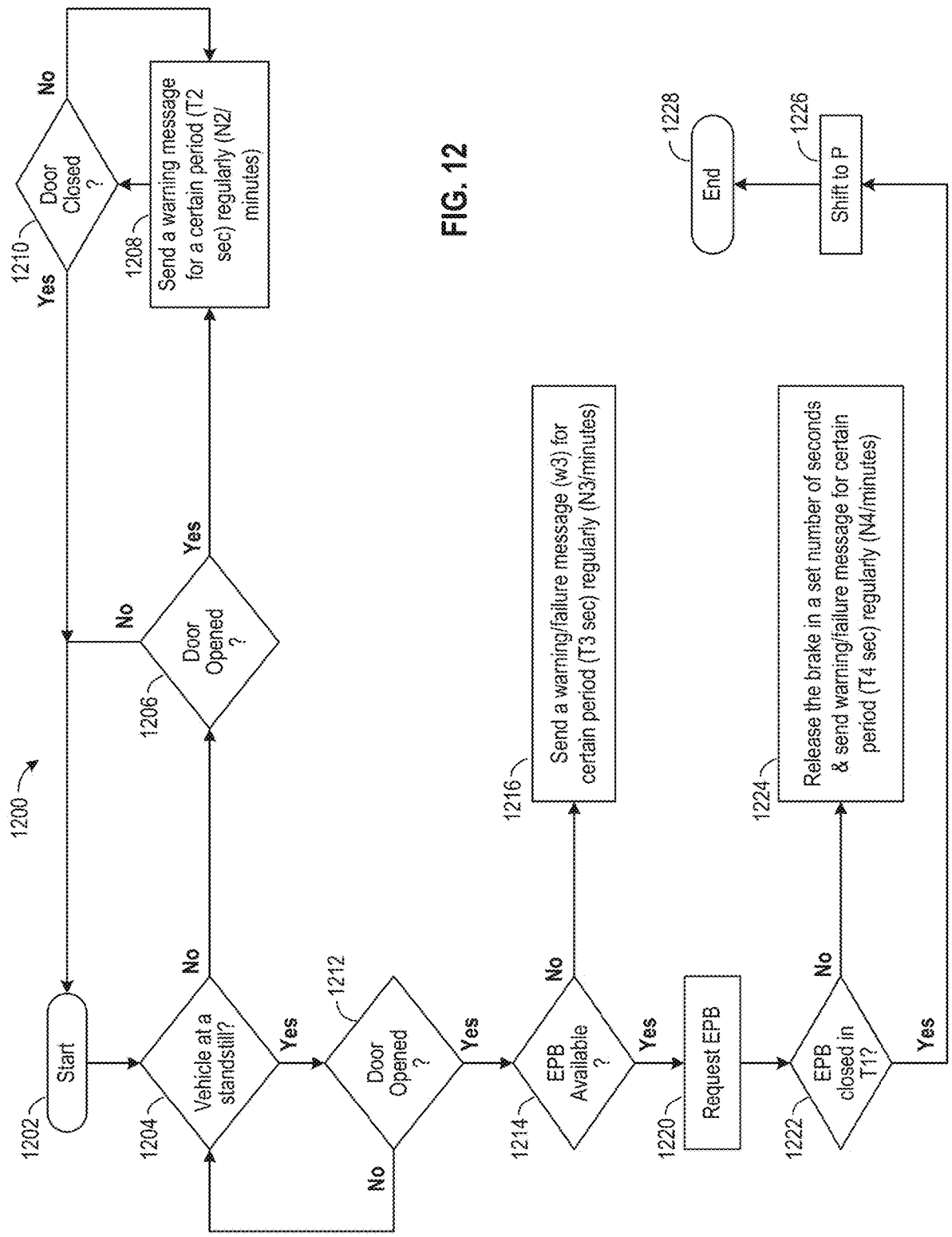
FIG. 12 depicts a method for handling an open door for a vehicle when a control system of the vehicle is in a manual control state, according to embodiments of the present disclosure.

FIG. 12 depicts a method for handling an open door for a vehicle when a control system of the vehicle is in a manual control state, according to embodiments of the present disclosure.

In one or more embodiments, the process starts (1202) by determining (1204) whether the vehicle is at a standstill. Responsive to detecting, using input from one or more sensors, that the vehicle is not at a standstill (i.e., the vehicle is moving), the process may comprise determining (1206) whether a door has been opened. In one or more embodiments, the monitored door or doors may be a set of one or more doors (e.g., driver's door, driver's and front passenger's door, all doors, etc.).

In one or more embodiments, while a door of the vehicle is detected as being open, the system may trigger (1208) a warning signal (i.e., to alert a driver to the issue and to have the driver apply brakes). The warning signal may have an on-off cycle and may be repeated for a set time interval (e.g., repeated N2 times per minute). The warning signal may continue (1210) until the open door is closed; once closed, the process may return (1202) to the start.

In one or more embodiments, responsive to detecting, using input from one or more sensors, that the vehicle is at a standstill (i.e., not moving), the control system may continually monitor (1212) for an open door.

Responsive to detecting a door of the vehicle being opened, the control system may determine (1214), using input from one or more sensors, whether a brake system (e.g., an electronic parking brake (EPB) system) is available for use.

If the brake system is not available, a warning/failure message may be triggered (1216) to alert a driver and/or others. The warning/failure signal may have an on-off cycle and may be repeated for a set time interval (e.g., repeated N3 times per minute).

If the EPB system is available for use, the EPB system may be requested to apply (1220) braking pressure to the vehicle to ensure that it safely remains stationary.

In one or more embodiments, the control system of the vehicle may monitor whether the EPB meets (1222) a condition after causing it to apply braking pressure. The condition may be any of a number of conditions, such as whether the EPB has reached a threshold level of braking engagement (e.g., the calibers of the EPB have fully closed) within an EPB engagement threshold time (e.g., within a set number of seconds).

In one or more embodiments, responsive to the EPB not meeting that condition, the EPB may be released (which may be released within a time period), and a warning/failure message may be sent (1224) to alert a driver and/or others. The warning/failure signal may have an on-off cycle and may be repeated for a set time interval (e.g., repeated N3 times per minute). In one or more embodiments, the vehicle may have an Automatic Vehicle Hold (AVH) feature, which is a driver-selectable feature designed to help reduce driver fatigue during stop-and-go driving by allowing a driver to bring the vehicle to a stop and remove the driver's foot from the brake while the feature holds the vehicle in place. If the vehicle has this feature, in one or more embodiments, the AVH holding may also be released.

In one or more embodiments, responsive to the EPB meeting that condition, the vehicle may be placed (1226) into a parked state (e.g., shift vehicle into park); thereby ending (1228) the method.

It shall be noted that a warning signal or a warning/failure signal may comprise one or more media types. For example, a message may include a light signal, a text message, an audible signal, a tactile signal, or any combination thereof. In one or more embodiments, the warning messages may be different and defined by the system based on vehicle mode and different vehicle stages.

It shall also be noted that the warnings, conditions, thresholds, and timing with a methodology and across methodologies may be the same or different.

It shall be noted that a vehicle may operate in an autonomous driving (AD) mode (e.g., FIG. 11), a manual mode (FIG. 12), or a combination thereof. In one or more embodiments, a server, driver, or vehicle manager may switch the vehicle mode between the AD mode and manual mode.

C. Computing System Embodiments

In one or more embodiments, aspects of the present patent document may be directed to, may include, or may be implemented on or use one or more computing systems. An information handling system/computing system may include any instrumentality or aggregate of instrumentalities operable to compute, calculate, determine, classify, process, transmit, receive, retrieve, originate, route, switch, store, display, communicate, manifest, detect, record, reproduce, handle, or utilize any form of information, intelligence, or data. For example, a computing system may be or may include a specialized processor-enabled computing system, a personal computer (e.g., laptop), tablet computer, mobile device (e.g., personal digital assistant (PDA), smartphone, phablet, tablet, etc.), smartwatch, server (e.g., blade server or rack server), a network storage device, camera, or any other suitable device and may vary in size, shape, performance, functionality, and price. The computing system may include random access memory (RAM), one or more processing resources such as a central processing unit (CPU) or hardware or software control logic, read-only memory (ROM), and/or other types of memory. Additional components of the computing system may include one or more drives (e.g., hard disk drive, solid-state drive, or both), one or more network ports for communicating with external devices as well as various input and output (I/O) devices, such as a keyboard, mouse, touchscreen, stylus, microphone, camera, trackpad, display, etc. The computing system may also include one or more buses operable to transmit communications between the various hardware components.

Figure 13:
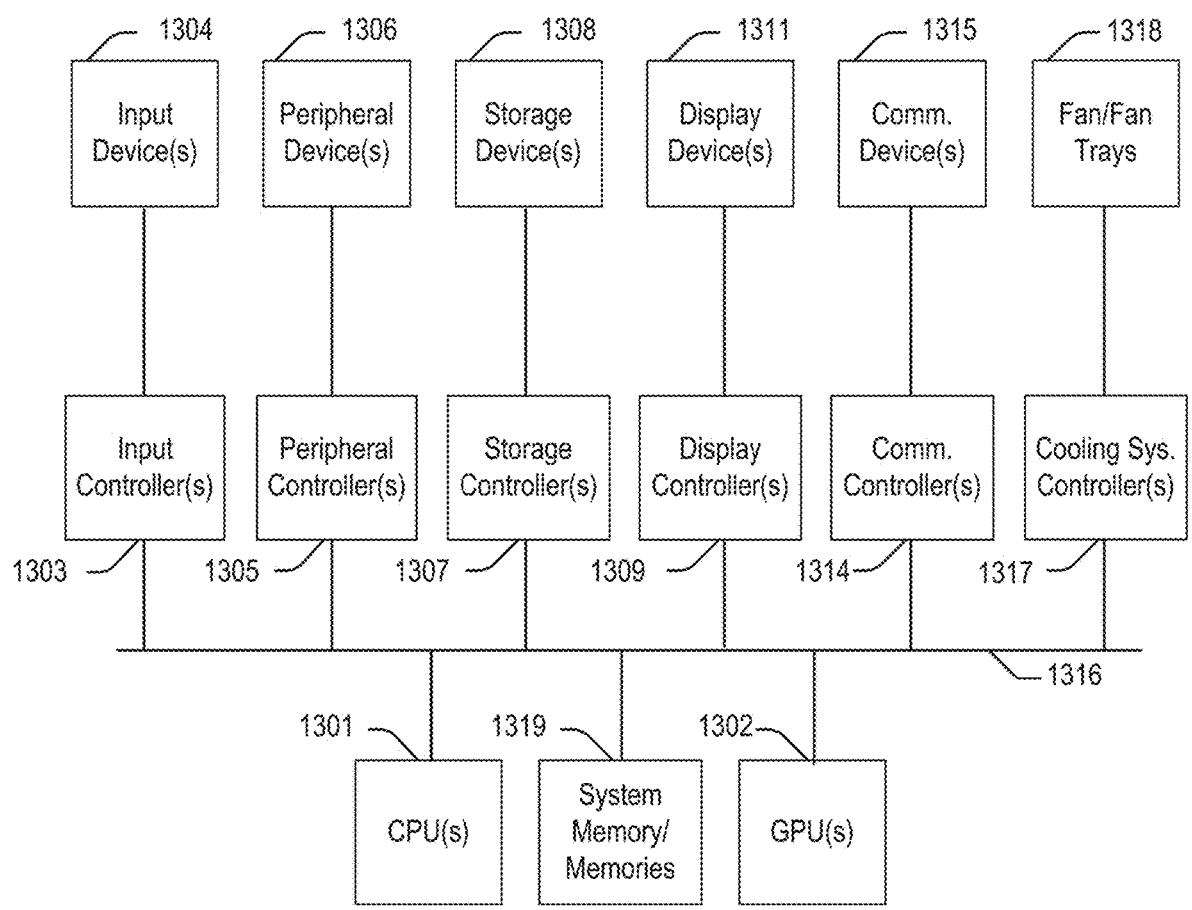
FIG. 13 depicts a simplified block diagram of a computing device, according to embodiments of the present disclosure.

FIG. 13 depicts a simplified block diagram of an information handling system (or computing system), according to embodiments of the present disclosure. It will be understood that the functionalities shown for system 1300 may operate to support various embodiments of a computing system—although it shall be understood that a computing system may be differently configured and include different components, including having fewer or more components as depicted in FIG. 13.

As illustrated in FIG. 13, the computing system 1300 includes one or more CPUs 1301 that provide computing resources and control the computer. CPU 1301 may be implemented with a microprocessor or the like, and may also include one or more graphics processing units (GPU) 1302 and/or a floating-point coprocessor for mathematical computations. In one or more embodiments, one or more GPUs 1302 may be incorporated within the display controller 1309, such as part of a graphics card or cards. The system 1300 may also include a system memory 1319, which may comprise RAM, ROM, or both.

A number of controllers and peripheral devices may also be provided, as shown in FIG. 13. An input controller 1303 represents an interface to various input device(s) 1304. The computing system 1300 may also include a storage controller 1307 for interfacing with one or more storage devices 1308 each of which includes a storage medium such as magnetic tape or disk, or an optical medium that might be used to record programs of instructions for operating systems, utilities, and applications, which may include embodiments of programs that implement various aspects of the present disclosure. Storage device(s) 1308 may also be used to store processed data or data to be processed in accordance with the disclosure. The system 1300 may also include a display controller 1309 for providing an interface to a display device 1311, which may be a cathode ray tube (CRT) display, a thin film transistor (TFT) display, organic light-emitting diode, electroluminescent panel, plasma panel, or any other type of display. The computing system 1300 may also include one or more peripheral controllers or interfaces 1305 for one or more peripherals 1306. Examples of peripherals may include one or more printers, scanners, input devices, output devices, sensors, and the like. A communications controller 1314 may interface with one or more communication devices 1315, which enables the system 1300 to connect to remote devices through any of a variety of networks including the Internet, a cloud resource (e.g., an Ethernet cloud, a Fiber Channel over Ethernet (FCoE)/Data Center Bridging (DCB) cloud, etc.), a local area network (LAN), a wide area network (WAN), a storage area network (SAN) or through any suitable electromagnetic carrier signals including infrared signals. As shown in the depicted embodiment, the computing system 1300 comprises one or more fans or fan trays 1318 and a cooling subsystem controller or controllers 1317 that monitors thermal temperature(s) of the system 1300 (or components thereof) and operates the fans/fan trays 1318 to help regulate the temperature.

In the illustrated system, all major system components may connect to a bus 1316, which may represent more than one physical bus. However, various system components may or may not be in physical proximity to one another. For example, input data and/or output data may be remotely transmitted from one physical location to another. In addition, programs that implement various aspects of the disclosure may be accessed from a remote location (e.g., a server) over a network. Such data and/or programs may be conveyed through any of a variety of machine-readable media including, for example: magnetic media such as hard disks, floppy disks, and magnetic tape; optical media such as compact discs (CDs) and holographic devices; magneto-optical media; and hardware devices that are specially configured to store or to store and execute program code, such as application specific integrated circuits (ASICs), programmable logic devices (PLDs), flash memory devices, other non-volatile memory (NVM) devices (such as 3D XPoint-based devices), and ROM and RAM devices.

Aspects of the present disclosure may be encoded upon one or more non-transitory computer-readable media with instructions for one or more processors or processing units to cause steps to be performed. It shall be noted that non-transitory computer-readable media shall include volatile and/or non-volatile memory. It shall be noted that alternative implementations are possible, including a hardware implementation or a software/hardware implementation. Hardware-implemented functions may be realized using ASIC(s), programmable arrays, digital signal processing circuitry, or the like. Accordingly, the "means" terms in any claims are intended to cover both software and hardware implementations. Similarly, the term "computer-readable medium or media" as used herein includes software and/or hardware having a program of instructions embodied thereon, or a combination thereof. With these implementation alternatives in mind, it is to be understood that the figures and accompanying description provide the functional information one skilled in the art would require to write program code (i.e., software) and/or to fabricate circuits (i.e., hardware) to perform the processing required.

It shall be noted that embodiments of the present disclosure may further relate to computer products with a non-transitory, tangible computer-readable medium that has computer code thereon for performing various computer-implemented operations. The media and computer code may be those specially designed and constructed for the purposes of the present disclosure, or they may be of the kind known or available to those having skill in the relevant arts. Examples of tangible computer-readable media include, for example: magnetic media such as hard disks, floppy disks, and magnetic tape; optical media such as CDs and holographic devices; magneto-optical media; and hardware devices that are specially configured to store or to store and execute program code, such as ASICs, PLDs, flash memory devices, other non-volatile memory devices (such as 3D XPoint-based devices), and ROM and RAM devices. Examples of computer code include machine code, such as produced by a compiler, and files containing higher-level code that are executed by a computer using an interpreter. Embodiments of the present disclosure may be implemented in whole or in part as machine-executable instructions that may be in program modules that are executed by a processing device. Examples of program modules include libraries, programs, routines, objects, components, and data structures. In distributed computing environments, program modules may be physically located in settings that are local, remote, or both.

Note that some or all of the components as shown and described above may be implemented in software, hardware, or a combination thereof. For example, such components can be implemented as software installed and stored in a persistent storage device, which can be loaded and executed in a memory by a processor to carry out the processes or operations described throughout this application. Alternatively, such components can be implemented as executable code programmed or embedded into dedicated hardware such as an integrated circuit (e.g., an application-specific IC or ASIC), a digital signal processor (DSP), or a field programmable gate array (FPGA), which can be accessed via a corresponding driver and/or operating system from an application. Furthermore, such components can be implemented as specific hardware logic in a processor or processor core as part of an instruction set accessible by a software component via one or more specific instructions.

Some portions of the preceding detailed descriptions have been presented in terms of algorithms and symbolic representations of operations on data bits within a computer memory. These algorithmic descriptions and representations are the ways used by those skilled in the data processing arts to convey the substance of their work most effectively to others skilled in the art. An algorithm is here, and generally, conceived to be a self-consistent sequence of operations leading to a desired result. The operations are those requiring physical manipulations of physical quantities.

It should be borne in mind, however, that all of these and similar terms are to be associated with the appropriate physical quantities and are merely convenient labels applied to these quantities. Unless specifically stated otherwise as apparent from the above discussion, it is appreciated that throughout the description, discussions utilizing terms such as those set forth in the claims below, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

Embodiments of the disclosure also relate to an apparatus for performing the operations herein. Such a computer program is stored in a non-transitory computer-readable medium. A machine-readable medium includes any mechanism for storing information in a form readable by a machine (e.g., a computer). For example, a machine-readable (e.g., computer-readable) medium includes a machine (e.g., a computer) readable storage medium (e.g., read-only memory ("ROM"), random access memory ("RAM"), magnetic disk storage media, optical storage media, flash memory devices).

The processes or methods depicted in the preceding figures may be performed by processing logic that comprises hardware (e.g., circuitry, dedicated logic, etc.), software (e.g., embodied on a non-transitory computer-readable medium), or a combination of both. Although the processes or methods are described above in terms of some sequential operations, it should be appreciated that some of the operations described may be performed in a different order. Moreover, some operations may be performed in parallel rather than sequentially.

Embodiments of the present disclosure are not described with reference to any particular programming language. It will be appreciated that a variety of programming languages may be used to implement the teachings of embodiments of the disclosure as described herein.

In the foregoing specification, embodiments of the disclosure have been described with reference to specific exemplary embodiments thereof. It will be evident that various modifications may be made thereto without departing from the broader spirit and scope of the disclosure as set forth in the following claims. It is intended that all permutations, enhancements, equivalents, combinations, and improvements thereto that are apparent to those skilled in the art upon a reading of the specification and a study of the drawings are included within the true spirit and scope of the present disclosure. It shall also be noted that elements of any claims may be arranged differently including having multiple dependencies, configurations, and combinations. The specification and drawings are, accordingly, to be regarded in an illustrative sense rather than a restrictive sense.

What is claimed is:

1. A processor-implemented method for operating an autonomous driving vehicle (ADV), the method comprising:
responsive to detecting, using input from one or more sensors, that the ADV is not at a standstill and while a door of the ADV is detected as being open:
activating one or more brake systems to apply braking pressure to reduce a speed of the ADV to a first speed threshold range; and
triggering a warning signal; and
responsive to detecting, using input from one or more sensors, that the ADV is at a standstill and responsive to detecting a door of the ADV being opened:
determining, using input from one or more sensors, whether a first brake system is available for use;
responsive to determining that the first brake system is available for use, causing the first brake system to apply braking pressure; and
responsive to determining that the first brake system is not available for use:

determining, using input from one or more sensors, whether a second brake system is available for use;
responsive to determining that the second brake system is available, causing the second brake system to apply braking pressure based one or more parameters related to the ADV; and
responsive to determining that the second brake system is not available:
  determining, using input from one or more sensors, whether a third brake system is available for use;
  responsive to determining that the third brake system is available, causing the third brake system to apply braking pressure based one or more parameters related to the ADV; and
  responsive to determining that the third brake system is not available, triggering a failure message to be generated.

2. The processor-implemented method of claim 1 wherein the first brake system is an electronic parking brake system, the second brake system is a primary brake system, and the third brake system is a secondary brake system.

3. The processor-implemented method of claim 1 further comprising:
responsive to initially determining the first brake system as being available for use but responsive to the first brake system failing to satisfy a first condition after causing the first brake system to apply braking pressure:
  deeming the first brake system as not being available for use; and
  proceeding to the step of determining, using input from one or more sensors, whether a first brake system is available for use.

4. The processor-implemented method of claim 3 wherein:
the first brake system is an electronic parking brake (EPB) system; and
the first condition comprises a threshold level of braking engagement by the EPB system within an EPB engagement threshold time.

5. The processor-implemented method of claim 1 wherein the one or more parameters related to the ADV comprise at least one of:
a weight value assigned to the ADV;
a degree of positive slope detected for the ADV; and
one or more road conditions.

6. The processor-implemented method of claim 1 wherein the step of responsive to determining that the third brake system is not available further comprises:
enabling an emergency braking feature.

7. The processor-implemented method of claim 1 wherein for each of the steps of causing the second brake system to apply braking pressure based one or more parameters related to the ADV and causing the third brake system to apply braking pressure based one or more parameters related to the ADV is continued until the ADV is detected as being at a standstill and the method further comprises:
causing the ADV to be placed in a park state.

8. The processor-implemented method of claim 1 further comprising:
responsive to a control system of the ADV being in a manual operation state, performing steps comprising:
  responsive to detecting, using input from one or more sensors, that the ADV is not at a standstill and responsive to detecting a door of the ADV being opened, triggering a warning signal; and
  responsive to detecting, using input from one or more sensors, that the ADV is at a standstill and responsive to detecting a door of the ADV being opened:
    determining, using input from one or more sensors, whether a first brake system is available for use;
    responsive to determining that the first brake system is not available for use, releasing the first brake system and triggering a failure message; and
    responsive to determining that the first brake system is available for use, causing the first brake system to apply braking pressure.

9. The processor-implemented method of claim 8 further comprising:
responsive to initially determining the first brake system as being available for use but responsive to the first brake system failing to satisfy a first condition after causing the first brake system to apply braking pressure:
  releasing the first brake system; and
  triggering a failure message.

10. A system comprising:
one or more processors; and
a non-transitory processor-readable medium or media comprising one or more sets of instructions which, when executed by at least one of the one or more processors, causes steps to be performed comprising:
  responsive to detecting, using input from one or more sensors of an autonomous driving vehicle (ADV), that the ADV is not at a standstill and while a door of the ADV is detected as being open:
    activating one or more brake systems to apply braking pressure to reduce a speed of the ADV to a first speed threshold range; and
    triggering a warning signal; and
  responsive to detecting, using input from one or more sensors, that the ADV is at a standstill and responsive to detecting a door of the ADV being opened:
    determining, using input from one or more sensors, whether a first brake system is available for use;
    responsive to determining that the first brake system is available for use, causing the first brake system to apply braking pressure; and
    responsive to determining that the first brake system is not available for use:
      determining, using input from one or more sensors, whether a second brake system is available for use;
      responsive to determining that the second brake system is available, causing the second brake system to apply braking pressure based one or more parameters related to the ADV; and
      responsive to determining that the second brake system is not available:
        determining, using input from one or more sensors, whether a third brake system is available for use; and
        responsive to determining that the third brake system is available:
          causing the third brake system to apply braking pressure based one or more parameters related to the ADV; and
        responsive to determining that the third brake system is not available, triggering a failure message to be generated.

11. The system of claim 10 wherein the non-transitory processor-readable medium or media further comprises one or more sets of instructions which, when executed by at least one of the one or more processors, causes steps to be performed comprising:
responsive to initially determining the first brake system as being available for use but responsive to the first brake system failing to satisfy a first condition after causing the first brake system to apply braking pressure:
deeming the first brake system as not being available for use; and
proceeding to the step of determining, using input from one or more sensors, whether a first brake system is available for use.

12. The system of claim 11 wherein:
the first brake system is an electronic parking brake (EPB) system; and
the first condition comprises a threshold level of braking engagement by the EPB system within an EPB engagement threshold time.

13. The system of claim 10 wherein the one or more parameters related to the ADV comprise at least one of:
a weight value assigned to the ADV;
a degree of positive slope detected for the ADV; and
one or more road conditions.

14. The system of claim 10 wherein the step of responsive to determining that the third brake system is not available further comprises:
enabling an emergency braking feature.

15. The system of claim 10 wherein for each of the steps of causing the second brake system to apply braking pressure based one or more parameters related to the ADV and causing the third brake system to apply braking pressure based one or more parameters related to the ADV is continued until the ADV is detected as being at a standstill and the method further comprises:
causing the ADV to be placed in a park state.

16. The system of claim 10 wherein the non-transitory processor-readable medium or media further comprises one or more sets of instructions which, when executed by at least one of the one or more processors, causes steps to be performed comprising:
responsive to a control system of the ADV being in a manual operation state, performing steps comprising:
responsive to detecting, using input from one or more sensors, that the ADV is not at a standstill and responsive to detecting a door of the ADV being opened, triggering a warning signal; and
responsive to detecting, using input from one or more sensors, that the ADV is at a standstill and responsive to detecting a door of the ADV being opened:
determining, using input from one or more sensors, whether a first brake system is available for use;
responsive to determining that the first brake system is not available for use, triggering a failure message; and
responsive to determining that the first brake system is available for use:
causing the first brake system to apply braking pressure; and
responsive to the first brake system failing to satisfy a first condition after causing the first brake system to apply braking pressure:
releasing the first brake system; and
triggering a failure message.

17. A non-transitory processor-readable medium or media comprising one or more sets of instructions which, when executed by at least one processor, causes steps to be performed comprising:
responsive to detecting, using input from one or more sensors of an autonomous driving vehicle (ADV), that the ADV is not at a standstill and while a door of the ADV is detected as being open:
activating one or more brake systems to apply braking pressure to reduce a speed of the ADV to a first speed threshold range; and
triggering a warning signal; and
responsive to detecting, using input from one or more sensors, that the ADV is at a standstill and responsive to detecting a door of the ADV being opened:
determining, using input from one or more sensors, whether a first brake system is available for use;
responsive to determining that the first brake system is available for use, causing the first brake system to apply braking pressure; and
responsive to determining that the first brake system is not available for use:
determining, using input from one or more sensors, whether a second brake system is available for use;
responsive to determining that the second brake system is available, causing the second brake system to apply braking pressure based one or more parameters related to the ADV; and
responsive to determining that the second brake system is not available:
determining, using input from one or more sensors, whether a third brake system is available for use;
responsive to determining that the third brake system is available, causing the third brake system to apply braking pressure based one or more parameters related to the ADV; and
responsive to determining that the third brake system is not available, triggering a failure message to be generated.

18. The non-transitory processor-readable medium or media of claim 17 further comprising one or more sets of instructions which, when executed by at least one processor, causes steps to be performed comprising:
responsive to initially determining the first brake system as being available for use but responsive to the first brake system failing to satisfy a first condition after causing the first brake system to apply braking pressure:
deeming the first brake system as not being available for use; and
proceeding to the step of determining, using input from one or more sensors, whether a first brake system is available for use.

19. The non-transitory processor-readable medium or media of claim 17 wherein for each of the steps of causing the second brake system to apply braking pressure based one or more parameters related to the ADV and causing the third brake system to apply braking pressure based one or more parameters related to the ADV is continued until the ADV is detected as being at a standstill and the non-transitory processor-readable medium or media further comprising one or more sets of instructions which, when executed by at least one processor, causes steps to be performed comprising:
causing the ADV to be placed in a park state.

20. The non-transitory processor-readable medium or media of claim 17 further comprising one or more sets of instructions which, when executed by at least one processor, causes steps to be performed comprising:

responsive to a control system of the ADV being in a manual operation state, performing steps comprising:

responsive to detecting, using input from one or more sensors, that the ADV is not at a standstill and responsive to detecting a door of the ADV being opened, triggering a warning signal; and responsive to detecting, using input from one or more sensors, that the ADV is at a standstill and responsive to detecting a door of the ADV being opened:

determining, using input from one or more sensors, whether a first brake system is available for use;

responsive to determining that the first brake system is not available for use, triggering a failure message; and responsive to determining that the first brake system is available for use:

causing the first brake system to apply braking pressure; and responsive to the first brake system failing to satisfy a first condition after causing the first brake system to apply braking pressure:

releasing the first brake system; and triggering a failure message.

\* \* \* \* \*